United States Patent
Liao et al.

(10) Patent No.: US 12,035,421 B2
(45) Date of Patent: Jul. 9, 2024

(54) PROCEDURE FOR OPTIMIZATION OF SELF-ORGANIZING NETWORK

(71) Applicant: Nokia Technologies Oy, Espoo (FI)

(72) Inventors: Qi Liao, Stuttgart (DE); Ilaria Malanchini, Stuttgart (DE)

(73) Assignee: NOKIA TECHNOLOGIES OY, Espoo (FI)

( * ) Notice: Subject to any disclaimer, the term of this patent is extended or adjusted under 35 U.S.C. 154(b) by 640 days.

(21) Appl. No.: 17/272,893

(22) PCT Filed: Sep. 6, 2018

(86) PCT No.: PCT/EP2018/073918
§ 371 (c)(1),
(2) Date: Mar. 2, 2021

(87) PCT Pub. No.: WO2020/048594
PCT Pub. Date: Mar. 12, 2020

(65) Prior Publication Data
US 2021/0219384 A1    Jul. 15, 2021

(51) Int. Cl.
*H04W 4/00* (2018.01)
*G06N 3/045* (2023.01)
*H04W 84/18* (2009.01)

(52) U.S. Cl.
CPC ............ *H04W 84/18* (2013.01); *G06N 3/045* (2023.01)

(58) Field of Classification Search
CPC ....... H04W 84/18; H04W 24/02; G06N 3/045
See application file for complete search history.

(56) References Cited

U.S. PATENT DOCUMENTS 9,730,086 B2 *  8/2017  Flanagan ............ H04W 64/003
9,743,301 B1 *  8/2017  Earl ...................... H04W 24/08
(Continued)

FOREIGN PATENT DOCUMENTS

CN    101159586 A    4/2008
CN    105813017 A    7/2016
(Continued)

OTHER PUBLICATIONS

Xu et al., "Modeling And Analyzing The Cross-Tier Handover In Heterogeneous Networks", IEEE Transactions on Wireless Communications, vol. 16, No. 12, Dec. 2017, pp. 7859-7869.
(Continued)

*Primary Examiner* — Stephen M D Agosta
(74) *Attorney, Agent, or Firm* — SQUIRE PATTON BOGGS (US) LLP

(57) ABSTRACT

An apparatus for use by a communication network control element or function configured to control a setting of parameters of a self-organizing communication network, the apparatus comprising at least one processing circuitry, and at least one memory for storing instructions to be executed by the processing circuitry, wherein the at least one memory and the instructions are configured to, with the at least one processing circuitry, cause the apparatus at least: to obtain a pre-trained network optimization model indicating a mapping between a communication network environment forming an input of the model, optimization actions or decisions forming an output of the model, and system performance indicators forming a reward, to cause sending, to at least one communication network element or function forming a part of the self-organizing communication network, a request for providing similarity data for a similarity analysis allowing to determine a similarity between a part of the self-organizing communication network for which the pre-trained network (Continued)

optimization model is derived and a part of the self-organizing communication network of the at least one communication network element or function to which the request is sent, to perform the similarity analysis for determining a similarity between the part of the self-organizing communication network for which the pre-trained network optimization model is derived and each part of the self-organizing communication network for which similarity data for the similarity analysis are received, to determine, on the basis of the similarity analysis, at least a part of the pre-trained network optimization model to be provided to the at least one communication network element or function forming a part of the self-organizing communication network from which the similarity data are received, and to cause sending of the determined part of the pre-trained network optimization model to the at least one communication network element or function forming a part of the self-organizing communication network from which the similarity data are received.

18 Claims, 9 Drawing Sheets

(56) References Cited

U.S. PATENT DOCUMENTS

| | | | | |
|---|---|---|---|---|
| 9,848,341 | B2* | 12/2017 | Zhuang | H04W 24/02 |
| 10,039,016 | B1 | 7/2018 | Larish et al. | |
| 10,764,933 | B2* | 9/2020 | Mehrabanzad | H04M 15/55 |
| 10,932,138 | B2* | 2/2021 | MacMullan | H04W 16/14 |
| 2011/0059744 | A1* | 3/2011 | Won | H04W 8/26 |
| | | | | 455/450 |
| 2013/0310046 | A1* | 11/2013 | Wegmann | H04W 36/30 |
| | | | | 455/438 |
| 2013/0331114 | A1* | 12/2013 | Gormley | H04W 28/18 |
| | | | | 455/452.1 |
| 2014/0269364 | A1* | 9/2014 | Knapp | H04L 41/083 |
| | | | | 370/252 |
| 2014/0274049 | A1* | 9/2014 | Singh | H04W 36/32 |
| | | | | 455/436 |
| 2015/0045008 | A1* | 2/2015 | Karla | H04W 24/02 |
| | | | | 455/418 |
| 2015/0382209 | A1* | 12/2015 | Sanneck | H04W 24/02 |
| | | | | 370/254 |
| 2016/0165462 | A1* | 6/2016 | Tan | H04W 16/10 |
| | | | | 370/254 |
| 2016/0183102 | A1 | 6/2016 | Sanneck et al. | |
| 2017/0083792 | A1 | 3/2017 | Rodriguez-Serrano et al. | |
| 2018/0247156 | A1 | 8/2018 | Holtham et al. | |
| 2019/0014488 | A1* | 1/2019 | Tan | G06N 3/044 |

FOREIGN PATENT DOCUMENTS

| | | |
|---|---|---|
| CN | 107391852 A | 11/2017 |
| IN | 201841014800 A | 5/2018 |
| WO | 2016/192746 A1 | 12/2016 |

OTHER PUBLICATIONS

Engels et al., "Autonomous Self-Optimization Of Coverage And Capacity In Lte Cellular Networks", IEEE Transactions on Vehicular Technology, vol. 62, No. 5, Jun. 2013, pp. 1989-2004.

Berger et al., "Joint Downlink And Uplink Tilt-Based Self-Organization Of Coverage And Capacity Under Sparse System Knowledge", IEEE Transactions on Vehicular Technology, vol. 65, No. 4, Apr. 2016, pp. 2259-2273.

Arulkumaran et al., "Deep Reinforcement Learning: A Brief Survey", IEEE Signal Processing Magazine, vol. 34, No. 6, Nov. 2017, pp. 26-38.

Mnih et al., "Human-Level Control Through Deep Reinforcement Learning", IEEE Transactions on Knowledge and Data Engineering, vol. 518, Feb. 26, 2015, 13 pages.

Pan et al., "A Survey On Transfer Learning", IEEE Transactions on Knowledge and Data Engineering, vol. 22, Oct. 2010, pp. 1-15.

International Search Report and Written Opinion received for corresponding Patent Cooperation Treaty Application No. PCT/EP2018/073918, dated Nov. 19, 2018, 18 pages.

Wang et al., "Self-Organizing Network Model; Draft-xwwang-Sonnetworkmodel-02.txt", Internet-Draft, Network Working Group, Nov. 17, 2009, pp. 1-45.

Office action received for corresponding European Patent Application No. 18765862.0, dated Mar. 4, 2022, 6 pages.

Chinese Office Action issued in corresponding Chinese Patent Application No. 201880098938.8 on Oct. 11, 2023.

* cited by examiner

PROCEDURE FOR OPTIMIZATION OF SELF-ORGANIZING NETWORK

RELATED APPLICATION

This application was originally filed as Patent Cooperation Treaty Application No. PCT/EP2018/073918 filed Sep. 6, 2018, each of which is incorporated herein by reference in its entirety.

BACKGROUND

Field

Examples of embodiments relate to apparatuses, methods, systems, computer programs, computer program products and (non-transitory) computer-readable media usable for conducting procedures for autonomously optimizing a communication network, such as a self-organizing network, for example in a LTE, 5G, or the like based network environment, which is also applicable to future network systems, such as beyond 5G.

Background Art

The following description of background art may include insights, discoveries, understandings or disclosures, or associations, together with disclosures not known to the relevant prior art, to at least some examples of embodiments of the present invention but provided by the invention. Some of such contributions of the invention may be specifically pointed out below, whereas other of such contributions of the invention will be apparent from the related context.

The following meanings for the abbreviations used in this specification apply:
3GPP 3$^{rd}$ Generation Partner Project
4G fourth generation
5G fifth generation
BS base station
CN core network
CPU central processing unit
DRL deep reinforcement learning
E-UTRAN evolved UMTS terrestrial radio access network
eNB evolved node B
EPC evolved packet core
EPS evolved packet system
ETSI European Telecommunications Standards Institute
gNB next generation node B
KPI key performance indicator
LTE Long Term Evolution
LTE-A LTE Advanced
OSS operation and support system
QCI quality of service class identifier
RAN radio access network
RAT radio access technology
ReLU rectifier linear unit
SON self-organizing network
UE user equipment
UMTS universal mobile telecommunication system

SUMMARY

According to an example of an embodiment, there is provided, for example, an apparatus for use by a communication network control element or function configured to control a setting of parameters of a self-organizing communication network, the apparatus comprising at least one processing circuitry, and at least one memory for storing instructions to be executed by the processing circuitry, wherein the at least one memory and the instructions are configured to, with the at least one processing circuitry, cause the apparatus at least: to obtain a pre-trained network optimization model indicating a mapping between a communication network environment forming an input of the model, optimization actions or decisions forming an output of the model, and system performance indicators forming a reward, to cause sending, to at least one communication network element or function forming a part of the self-organizing communication network, a request for providing similarity data for a similarity analysis allowing to determine a similarity between a part of the self-organizing communication network for which the pre-trained network optimization model is derived and a part of the self-organizing communication network of the at least one communication network element or function to which the request is sent, to perform the similarity analysis for determining a similarity between the part of the self-organizing communication network for which the pre-trained network optimization model is derived and each part of the self-organizing communication network for which similarity data for the similarity analysis are received, to determine, on the basis of the similarity analysis, at least a part of the pre-trained network optimization model to be provided to the at least one communication network element or function forming a part of the self-organizing communication network from which the similarity data are received, and to cause sending of the determined part of the pre-trained network optimization model to the at least one communication network element or function forming a part of the self-organizing communication network from which the similarity data are received.

Furthermore, according to an example of an embodiment, there is provided, for example, a method for use in a communication network control element or function configured to control a setting of parameters of a self-organizing communication network, the method comprising obtaining a pre-trained network optimization model indicating a mapping between a communication network environment forming an input of the model, optimization actions or decisions forming an output of the model, and system performance indicators forming a reward, causing sending, to at least one communication network element or function forming a part of the self-organizing communication network, a request for providing similarity data for a similarity analysis allowing to determine a similarity between a part of the self-organizing communication network for which the pre-trained network optimization model is derived and a part of the self-organizing communication network of the at least one communication network element or function to which the request is sent, performing the similarity analysis for determining a similarity between the part of the self-organizing communication network for which the pre-trained network optimization model is derived and each part of the self-organizing communication network for which similarity data for the similarity analysis are received, determining, on the basis of the similarity analysis, at least a part of the pre-trained network optimization model to be provided to the at least one communication network element or function forming a part of the self-organizing communication network from which the similarity data are received, and causing sending of the determined part of the pre-trained network optimization model to the at least one communication network element or function forming a part of the self-organizing communication network from which the similarity data are received.

According to further refinements, these examples may include one or more of the following features:

the pre-trained network optimization model may be obtained by receiving data including the pre-trained network optimization model from a communication network element or function belonging to a part of the self-organizing communication network, wherein the processing may be conducted in a central unit being in charge of collecting and managing usage of pre-trained network optimization models derived in the self-organizing communication network;

the pre-trained network optimization model may be obtained by deriving the pre-trained network optimization model from data and measurements conducted in a part of the self-organizing communication network, wherein the processing may be conducted in communication network element or function forming a part of a distributed system for managing usage of pre-trained network optimization models derived in the self-organizing communication network;

the pre-trained network optimization model may be derived by using a deep reinforcement learning algorithm based on a plurality of convolutional layers employed for capturing spatial and temporal correlations between the network environment of the part of the self-organizing communication network, and a plurality of fully connected layers employed for reducing dimensions of data processing in the plurality of convolutional layers to a desired output dimension, wherein the pre-trained network optimization model may be defined by a set of model parameters and hyperparameters;

for deriving the pre-trained network optimization model, input data may be prepared by determining how users of the communication network part are spatially distributed in the part of the self-organizing communication network and how the spatial distribution of the users evolves over time, determining a user activity level of the users in a specified time period, and generating an input sample including at least one of an image and a sequence of images in which a position of each pixel corresponds to a geographical grid or physical location of the users and an intensity or color value of each pixel corresponds to a user activity level aggregated over the geographical grid at the specified time period;

the model parameters may include at least one of weight matrices between each two successive layers of the plurality of convolutional layers and the plurality of fully connected layers, and bias vectors between each two successive layers of the plurality of convolutional layers and the plurality of fully connected layers, and the hyperparameters may include at least one of a number of layers of the plurality of convolutional layers and the plurality of fully connected layers, a number of units at each layer of the plurality of convolutional layers and the plurality of fully connected layers, a type of an activation function, a number of filters and filter size in each of the plurality of convolutional layers, a stride size of each maximum or average pooling layer;

the request for providing similarity data for a similarity analysis caused to be sent to at least one communication network element or function forming a part of the self-organizing communication network may be included in an indication that a pre-trained network optimization model is present;

for performing the similarity analysis for determining the similarity between the part of the self-organizing communication network for which the pre-trained network optimization model is derived and a part of the self-organizing communication network for which similarity data for the similarity analysis are received, a similarity measure may be calculated on the basis of network properties of the part of the self-organizing communication network for which the pre-trained network optimization model is derived and the part of the self-organizing communication network for which similarity data for the similarity analysis are received, wherein the network properties may comprise data related to a single data point and data related to statistical measures and include at least one of location information, geographical features, mobility patterns, data demand statistics, and histograms approximating a probability density function;

for determining at least a part of the pre-trained network optimization model to be provided to the at least one communication network element or function forming a part of the self-organizing communication network from which the similarity data are received, the calculated similarity measure may be processed, and, for forming the part of the pre-trained network optimization model to be provided, a subset of parameters and hyperparameters defining low and medium layers of the pre-trained network optimization model may be selected, wherein the higher the similarity between the part of the self-organizing communication network for which the pre-trained network optimization model is derived and the part of the self-organizing communication network for which similarity data for the similarity analysis are received is according to the similarity measure, the higher the number of parameters and hyperparameters selected for the subset becomes.

Furthermore, according to an example of an embodiment, there is provided, for example, an apparatus for use by a communication network element or function configured to conduct a setting of parameters of a self-organizing communication network, the apparatus comprising at least one processing circuitry, and at least one memory for storing instructions to be executed by the processing circuitry, wherein the at least one memory and the instructions are configured to, with the at least one processing circuitry, cause the apparatus at least: to receive, from a communication network control element or function forming a part of the self-organizing communication network, and process a request for providing similarity data for a similarity analysis allowing to determine a similarity between parts of the self-organizing communication network, to decide whether similarity data are required to be sent, in case the decision is affirmative, to cause sending of the requested similarity data to the communication network control element or function from which the request is received, to receive data indicating at least a part of a pre-trained network optimization model indicating a mapping between a communication network environment forming an input of the model, optimization actions or decisions forming an output of the model, and system performance indicators forming a reward, and to process the data indicating at least a part of a pre-trained network optimization model for generating an own network optimization model by adapting the received pre-trained network optimization model to the own part of the self-organizing communication network.

Furthermore, according to an example of an embodiment, there is provided, for example, a method for use in a communication network element or function configured to conduct a setting of parameters of a self-organizing communication network, the method comprising receiving, from a communication network control element or function forming a part of the self-organizing communication network, and process a request for providing similarity data for a similarity analysis allowing to determine a similarity between parts of the self-organizing communication network, deciding whether similarity data are required to be sent, in case the decision is affirmative, causing sending of the requested similarity data to the communication network control element or function from which the request is received, receiving data indicating at least a part of a pre-trained network optimization model indicating a mapping between a communication network environment forming an input of the model, optimization actions or decisions forming an output of the model, and system performance indicators forming a reward, and processing the data indicating at least a part of a pre-trained network optimization model for generating an own network optimization model by adapting the received pre-trained network optimization model to the own part of the self-organizing communication network.

According to further refinements, these examples may include one or more of the following features:
  the request for providing similarity data for the similarity analysis may be received from a central unit being in charge of collecting and managing usage of pre-trained network optimization models derived in the self-organizing communication network, or from a communication network element or function deriving the pre-trained network optimization model and forming a part of a distributed system for managing usage of pre-trained network optimization models derived in the self-organizing communication network, wherein the request for providing similarity data may be included in an indication that a pre-trained network optimization model is present;
  for deciding whether similarity data are required to be sent in response to the request, it may be checked whether or not an own network optimization model is available, in case an own network optimization model is not available, it may be decided that similarity data are required to be sent, wherein the similarity data are related to network properties and comprise data related to a single data point and data related to statistical measures and include at least one of location information, geographical features, mobility patterns, data demand statistics, and histograms approximating a probability density function, and in case an own network optimization model is available, it may be decided that similarity data are not required to be sent, and to cause sending of an indication to reject the request for similarity data;
  the pre-trained network optimization model may be based on a deep reinforcement learning algorithm based on a plurality of convolutional layers employed for capturing spatial and temporal correlations between the network environment of a part of the self-organizing communication network, and a plurality of fully connected layers employed for reducing dimensions of data processing in the plurality of convolutional layers to a desired output dimension, wherein the pre-trained network optimization model is defined by a set of model parameters and hyperparameters;
  the model parameters may include at least one of weight matrices between each two successive layers of the plurality of convolutional layers and the plurality of fully connected layers, and bias vectors between each two successive layers of the plurality of convolutional layers and the plurality of fully connected layers, and the hyperparameters may include at least one of a number of layers of the plurality of convolutional layers and the plurality of fully connected layers, a number of units at each layer of the plurality of convolutional layers and the plurality of fully connected layers, a type of an activation function, a number of filters and filter size in each of the plurality of convolutional layers, a stride size of each maximum or average pooling layer;
  for processing the data indicating at least a part of a pre-trained network optimization model for generating an own network optimization model, the received part of the pre-trained network optimization model may be modified by conducting at least one of adding at least one of a new convolutional layer and a new fully connected layer to the part of the pre-trained network optimization model, modifying at least one convolutional layer and fully connected layer of the part of the pre-trained network optimization model, and the modified network optimization model including the added or modified layers may be retrained by using measurement data obtained in the own part of the self-organizing communication network;
  for processing the data indicating at least a part of a pre-trained network optimization model for generating an own network optimization model, at least one of a fine-tuning of the received part of the pre-trained network optimization model and an updating of the pre-trained network optimization model with data collected in the own part of the self-organizing communication network by using transfer learning may be conducted.

In addition, according to embodiments, there is provided, for example, a computer program product for a computer, including software code portions for performing the steps of the above defined methods, when said product is run on the computer. The computer program product may include a computer-readable medium on which said software code portions are stored. Furthermore, the computer program product may be directly loadable into the internal memory of the computer and/or transmittable via a network by means of at least one of upload, download and push procedures.

BRIEF DESCRIPTION OF THE DRAWINGS

Some embodiments of the present invention are described below, by way of example only, with reference to the accompanying drawings, in which.

DESCRIPTION OF EMBODIMENTS

Figure 1:
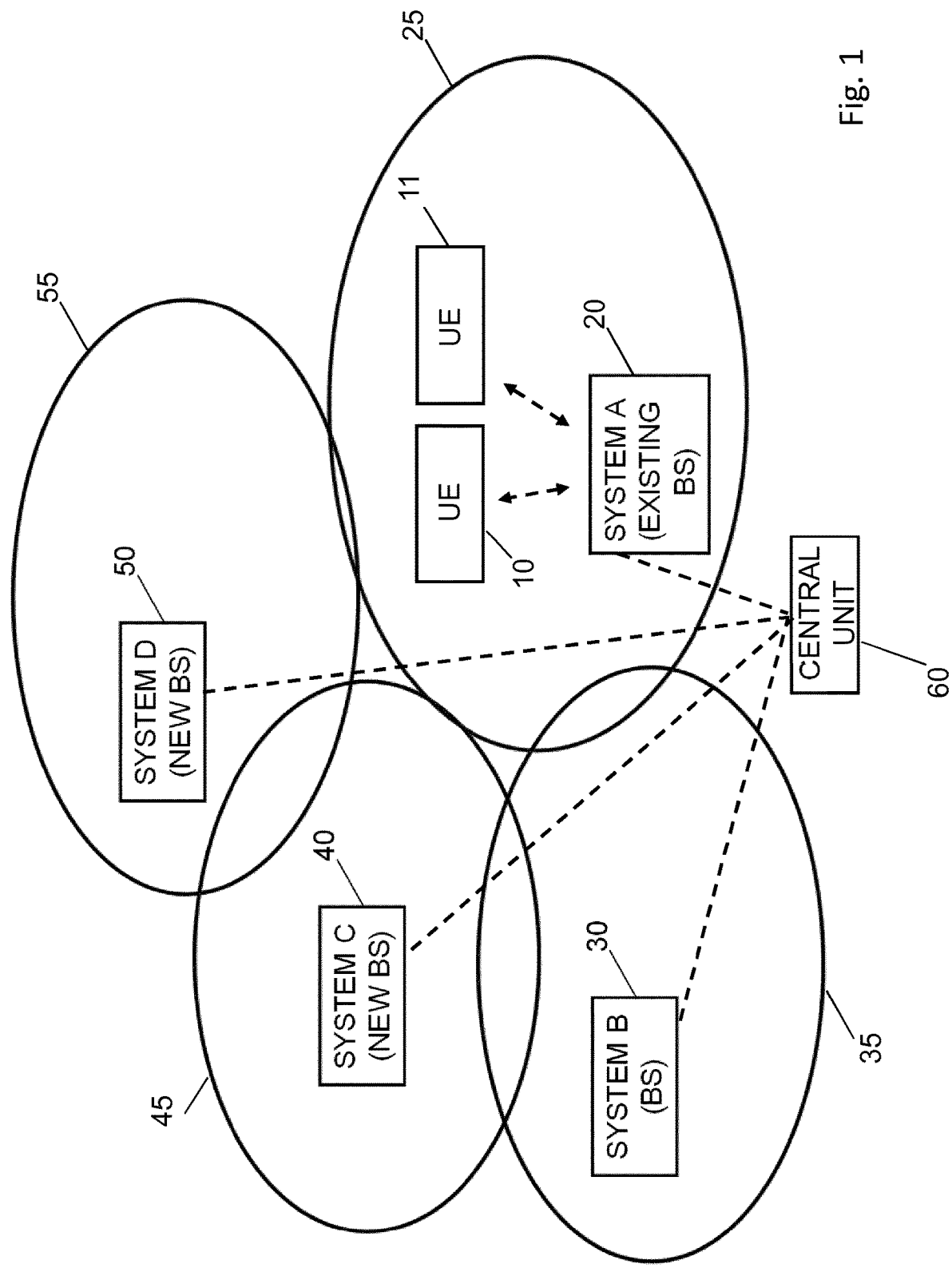
FIG. 1 shows a diagram illustrating an example of a network architecture where examples of embodiments are implementable.

In the last years, an increasing extension of communication networks, e.g. of wire based communication networks, such as the Integrated Services Digital Network (ISDN), DSL, or wireless communication networks, such as the cdma2000 (code division multiple access) system, cellular $3^{rd}$ generation (3G) like the Universal Mobile Telecommunications System (UMTS), fourth generation (4G) communication networks or enhanced communication networks based e.g. on LTE or LTE-A, fifth generation (5G) communication networks, cellular $2^{nd}$ generation (2G) communication networks like the Global System for Mobile communications (GSM), the General Packet Radio System (GPRS), the Enhanced Data Rates for Global Evolution (EDGE), or other wireless communication system, such as the Wireless Local Area Network (WLAN), Bluetooth or Worldwide Interoperability for Microwave Access (WiMAX), took place all over the world. Various organizations, such as the European Telecommunications Standards Institute (ETSI), the $3^{rd}$ Generation Partnership Project (3GPP), Telecoms & Internet converged Services & Protocols for Advanced Networks (TISPAN), the International Telecommunication Union (ITU), $3^{rd}$ Generation Partnership Project 2 (3GPP2), Internet Engineering Task Force (IETF), the IEEE (Institute of Electrical and Electronics Engineers), the WiMAX Forum and the like are working on standards or specifications for telecommunication network and access environments.

In a traditional cellular communication network, for properly establishing and handling a communication between two or more end points (e.g. communication stations or elements, such as terminal devices, user equipments (UEs), or other communication network elements, a database, a server, host etc.), one or more network elements or functions (e.g. virtualized network functions), such as communication network control elements or functions, for example access network elements like access points, radio base stations, relay stations, eNBs, gNBs etc., and core network elements or functions, for example control nodes, support nodes, service nodes, gateways, user plane functions, access and mobility functions etc., may be involved, which may belong to one communication network system or different communication network systems.

The growing trends for 5G networks, namely dense deployment, new radio access technology, and data analytics, rise the challenges of rapidly adapting to unknown scenarios and making fast network optimization decisions even when limited information is available. In this context, it is desired to accelerate the network's self-planning and self-optimization mechanisms and to achieve a better performance as a reaction to changes, such as after a new deployment, a hardware or software update, and the application of new radio access technologies, while keeping the cost for trial measurements and data transfer low.

A so-called self-organizing network (SON) is implemented in LTE and UMTS based networks and will also employed for 5G and possible further future communication networks. SON provides an automation technology designed to improve the planning, configuration, management, optimization and healing of parts of a communication network, such as RAN or CN elements or subsystems. For example, when adding a new BS or the like in the network environment, SON allows that the new base station conducts a self-configuration while all already operational base stations can self-optimize parameters and algorithmic behavior in response to observed network performance and radio conditions. That is, when a new BS is added to the network, it gets immediately recognized and registered by the network. Furthermore, neighboring BS can automatically adjust their technical parameters (such as emission power, antenna tilt, etc.) in order to provide the required coverage and capacity, and, in the same time, avoid interference.

Another functionality of SON is a self-optimization processing. That is, a BS is able to alter configuration parameters that control various aspects of the cell site for changing network behavior, e.g. based on observations of both the BS itself and measurements at a UE or the like. For example, self-optimization use cases can include coverage and capacity optimization, handover/mobility robustness optimization, cell outage detection and compensation, and interference mitigation.

Known network self-optimization use cases can be classified into two categories:

(1) optimization based on the approximated mathematical models of networks and (2) online learning and optimization with feedback measurements.

As an example, for the optimization based on the approximated mathematical models of networks, assume e.g. an analytical model developed, for example, for cross-tier handover processes in heterogeneous networks (HetNets) using stochastic geometry.

Another example is e.g. to provide a mixed-integer linear program based on an interference approximation model to jointly optimize tuning site activity, transmission power and antenna downtilt for optimization. However, when using such approximated mathematical models, due to the increasing complexity of communication networks, in particular when considering the planned complexity of future network systems based e.g. of 5G, it is almost impossible to derive closed-form mathematical models that can approximate a real scenario for a system-level optimization task that involves numerous interacting variables and parameters.

On the other hand, the approach considering online learning and optimization with feedback measurements is related to the attempt to try adapting to a real scenario with data-driven searching approaches. Such an approach is implemented e.g. in cases where a network architecture cannot be suitably modeled. One example is e.g. to implement a tilt searching algorithm that modifies a network's antenna tilts iteratively based on feedback measurements so as to optimize jointly the uplink and downlink performance of coverage and capacity. However, an approach based e.g. on such algorithm requires long time to converge due to the lack of a comprehensive knowledge of the system.

That is, neither the model-based optimization nor the conventional data-driven searching approaches are optimal: the former cannot adapt to varying or new and thus unknown network states, while the latter requires a large amount of data to obtain sufficient information for enabling a fast convergence of the optimization algorithm. In this context, it is to be noted that there are costs for the data in the latter case, including data collection, data storage, and data transfer, which may also be high in terms of various types of resource consumption, e.g., driving tests, data storage, and data transmission delay.

Consequently, in the following, different exemplifying embodiments will be described using, as an example of a communication network to which examples of embodiments may be applied, a communication network architecture based on 3GPP standards for a communication network, such as a 5G network, without restricting the embodiments to such architectures, however. It is obvious for a person skilled in the art that the embodiments may also be applied to other kinds of communication networks having suitable means by adjusting parameters and procedures appropriately, e.g. 4G (LTE) networks, Wi-Fi, worldwide interoperability for microwave access (WiMAX), Bluetooth®, personal communications services (PCS), ZigBee®, wideband code division multiple access (WCDMA), systems using ultra-wideband (UWB) technology, mobile ad-hoc networks (MANETs), wired access, etc. Furthermore, without loss of generality, the description of some examples of embodiments is related to a mobile communication network, but principles of the invention can be extended and applied to any other type of communication network, such as a wired communication network.

The following examples and embodiments are to be understood only as illustrative examples. Although the specification may refer to "an", "one", or "some" example(s) or embodiment(s) in several locations, this does not necessarily mean that each such reference is related to the same example(s) or embodiment(s), or that the feature only applies to a single example or embodiment. Single features of different embodiments may also be combined to provide other embodiments. Furthermore, terms like "comprising" and "including" should be understood as not limiting the described embodiments to consist of only those features that have been mentioned; such examples and embodiments may also contain features, structures, units, modules etc. that have not been specifically mentioned.

A basic system architecture of a (tele)communication network including a mobile communication system where some examples of embodiments are applicable may include an architecture of one or more communication networks including wireless access network subsystem(s) and core network(s). Such an architecture may include one or more communication network control elements or functions, access network elements, radio access network elements, access service network gateways or base transceiver stations, such as a base station (BS), an access point (AP), a NodeB (NB), an eNB or a gNB, a distributed or a centralized unit, which controls a respective coverage area or cell(s) and with which one or more communication stations such as communication elements, user devices or terminal devices, like a UE, or another device having a similar function, such as a modem chipset, a chip, a module etc., which can also be part of a station, an element, a function or an application capable of conducting a communication, such as a UE, an element or function usable in a machine-to-machine communication architecture, or attached as a separate element to such an element, function or application capable of conducting a communication, or the like, are capable to communicate via one or more channels via one or more communication beams for transmitting several types of data in a plurality of access domains. Furthermore, core network elements or network functions, such as gateway network elements/functions, mobility management entities, a mobile switching center, servers, databases and the like may be included.

The general functions and interconnections of the described elements and functions, which also depend on the actual network type, are known to those skilled in the art and described in corresponding specifications, so that a detailed description thereof is omitted herein. However, it is to be noted that several additional network elements and signaling links may be employed for a communication to or from an element, function or application, like a communication endpoint, a communication network control element, such as a server, a gateway, a radio network controller, and other elements of the same or other communication networks besides those described in detail herein below.

A communication network architecture as being considered in examples of embodiments may also be able to communicate with other networks, such as a public switched telephone network or the Internet. The communication network may also be able to support the usage of cloud services for virtual network elements or functions thereof, wherein it is to be noted that the virtual network part of the telecommunication network can also be provided by non-cloud resources, e.g. an internal network or the like. It should be appreciated that network elements of an access system, of a core network etc., and/or respective functionalities may be implemented by using any node, host, server, access node or entity etc. being suitable for such a usage. Generally, a network function can be implemented either as a network element on a dedicated hardware, as a software instance running on a dedicated hardware, or as a virtualized function instantiated on an appropriate platform, e.g., a cloud infrastructure.

Furthermore, a network element, such as communication elements, like a UE, a terminal device, control elements or functions, such as access network elements, like a base station (BS), an eNB, a radio network controller, a core network control element or function, such as a gateway element, or other network elements or functions, as described herein, and any other elements, functions or applications may be implemented by software, e.g. by a computer program product for a computer, and/or by hardware. For executing their respective processing, correspondingly used devices, nodes, functions or network elements may include several means, modules, units, components, etc. (not shown) which are required for control, processing and/or communication/signaling functionality. Such means, modules, units and components may include, for example, one or more processors or processor units including one or more processing portions for executing instructions and/or programs and/or for processing data, storage or memory units or means for storing instructions, programs and/or data, for serving as a work area of the processor or processing portion and the like (e.g. ROM, RAM, EEPROM, and the like), input or interface means for inputting data and instructions by software (e.g. floppy disc, CD-ROM, EEPROM, and the like), a user interface for providing monitor and manipulation possibilities to a user (e.g. a screen, a keyboard and the like), other interface or means for establishing links and/or connections under the control of the processor unit or portion (e.g. wired and wireless interface means, radio interface means including e.g. an antenna unit or the like, means for forming a radio communication part etc.) and the like, wherein respective means forming an interface, such as a radio communication part, can be also located on a remote site (e.g. a radio head or a radio station etc.). It is to be noted that in the present specification processing portions should not be only considered to represent physical portions of one or more processors, but may also be considered as a logical division of the referred processing tasks performed by one or more processors.

It should be appreciated that according to some examples, a so-called "liquid" or flexible network concept may be employed where the operations and functionalities of a network element, a network function, or of another entity of the network, may be performed in different entities or functions, such as in a node, host or server, in a flexible manner. In other words, a "division of labor" between involved network elements, functions or entities may vary case by case.

FIG. 1 shows a diagram illustrating an example of a network architecture where examples of embodiments are implementable.

Specifically, FIG. 1 illustrates a situation where a part of a communication network, such as a 5G network, is established and operating, and where additional communication network parts are added or modified so that the overall situation changes. It is assumed that the communication network is configured to conduct at least in part an autonomous configuration of network parameters and settings, such as a SON.

For example, a situation considered in examples of embodiments is a case where new base stations or access points are established, which includes e.g. new macro cell, pico cells or the like, new access points of another sort of RAT, such as WiFi access points or the like, a modification like an updating of already existing access points or base stations (cells) to new technologies, and the like. The communication network parts can comprise one additional or modified network element or function, like a base station or the like, or a subsystem or subnetwork consisting multiple network elements or functions, e.g. when a subsystem with a plurality of interconnected pico cells or the like is established in the area of an existing macro cell. In the following, corresponding network parts are also referred to as systems. Other scenarios having a similar impact are also conceivable.

Reference number 20 denotes a BS (such as a gNB) controlling a cell 25. In the example presented in FIG. 1, it is assumed that the cell 25 and the BS 20 are operating and represent an existing system (also referred to as a system A) where a network optimization model can be established and trained. For training the model, measurements related to communications with e.g. UEs communicating in the cell 25 are used, such as with UE 10 and UE 11, wherein the number of communication parties used for training the model can be variably set.

Reference number 30 denotes another BS (such as a gNB) controlling a cell 35. In the example presented in FIG. 1, similar to cell 25 and BS 20, it is assumed that the cell 35 and the BS 30 are already operating and form another existing system (also referred to as a system B) where a network optimization model can be established and trained.

Reference number 40 denotes a BS (such as a gNB) which is to be newly installed in the communication network for controlling a new cell 45. Similar, reference number 50 denotes a BS (such as a gNB) which is to be newly installed in the communication network for controlling a new cell 55. Hence, cell 45 and BS 40 form a new system (also referred to as a system C), and cell 55 and BS 50 form a new system (also referred to as a system D) for which a network optimization model is not (yet) generated.

Furthermore, reference sign 60 denotes a central unit. It is to be noted that the central unit 60 is used in some examples of embodiments in which a centralized approach for a network optimization is employed (described later e.g. in connection with FIG. 3), so that the central unit 60 is not necessarily involved in each processing described below.

Nevertheless, when being implemented, the central unit 60 is responsible, for example, for collecting network optimization models and managing distribution of models to other systems, e.g. after conducting a selection of model data to be provided on the basis of a similarity analysis. The central unit 60 is, for example, part of a network element or function of the CN, the OSS or the like, and is able to communicate with network elements or functions of the communication network under consideration (i.e. of the SON), such as the BSs 20, 30, 40, 50 of FIG. 1.

It is to be noted that there may be further network elements or functions besides those defined above to be considered for a network optimization processing according to examples of embodiments.

In accordance with examples of embodiments, a network optimization procedure is implemented in which a self-transfer optimization method based on transfer learning within a deep reinforcement learning (DRL) framework is used to accelerate network optimization decisions when experiencing changes or new deployments in the network environment.

DRL is a learning strategy for autonomous systems, allowing for example to learn control policies directly from sensor or measurement inputs in the real world. That is, fully autonomous agents are provided which are able to interact with their environments to learn optimal behaviors, improving over time through trial and error.

Figure 4:
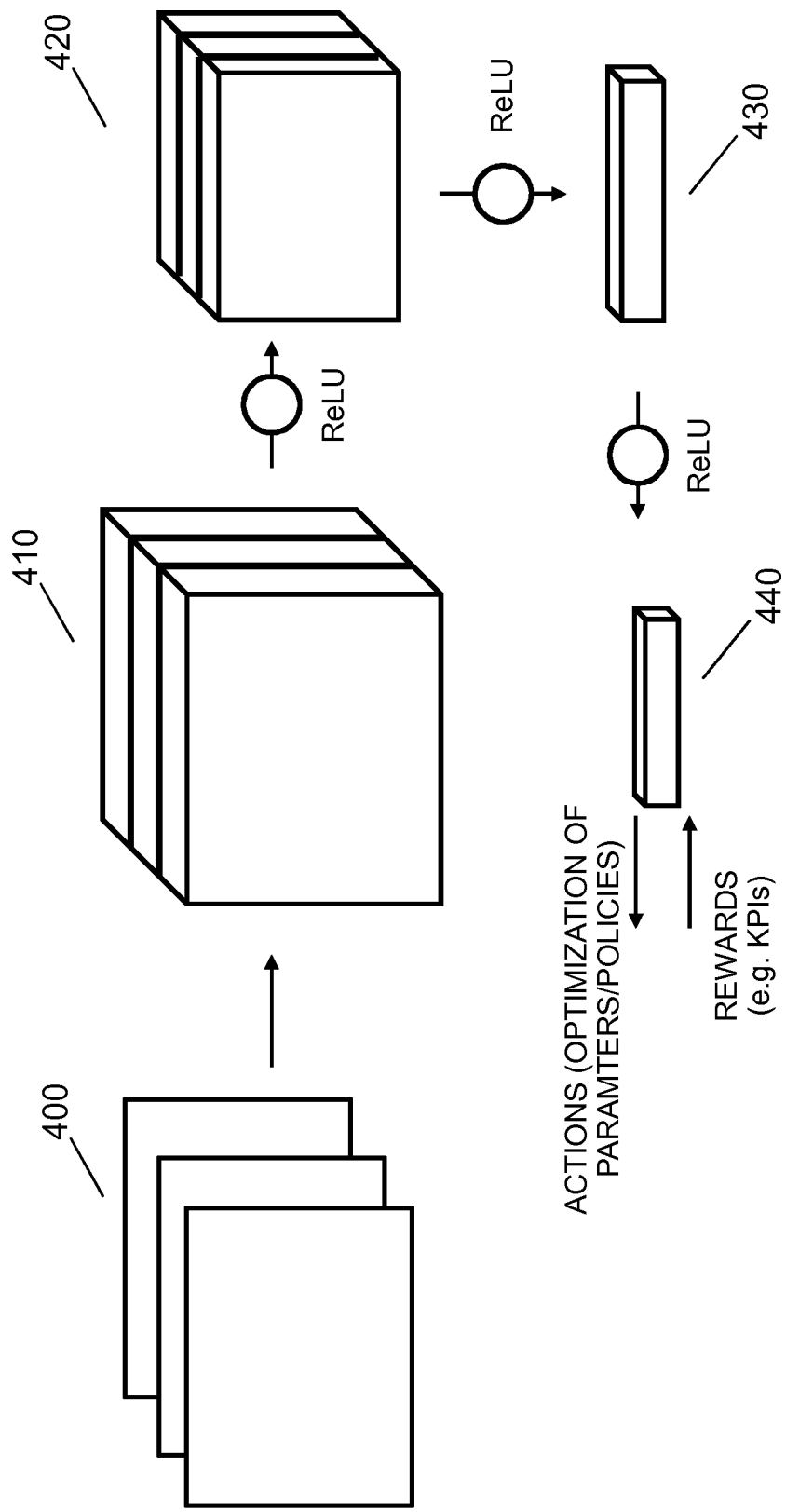
FIG. 4 shows a schematic diagram illustrating a deep reinforcement learning process usable according to some examples of embodiments.

FIG. 4 shows a schematic diagram illustrating a deep reinforcement learning process usable according to some examples of embodiments. Specifically, FIG. 4 represents an example of a DRL network usable according to some examples of embodiments, wherein temporal and spatial correlation of input network states are captured, wherein as a result the DRL network learns to make optimization decisions.

Basically, DRL networks consist of at least convolutional layers (in FIG. 4 indicated by reference signs 410 and 420), and fully connected layers (in FIG. 4, indicated by reference signs 430 and 440). The process flow in the DRL network is, for example, that an input 400, such as mappings or representations of input samples of sequences of user activites indicating a temporal and spatial-dependent evolution, is processed by a plurality of convolutional layers (in FIG. 4, two convolutional layers 410 and 420 are represented, but other numbers of layers can be employed as well) and a plurality of fully connected layers (in FIG. 4, two fully connected layers 430 and 440 are represented, but other numbers of layers can be employed as well), wherein and each hidden layer is followed by an activation function. In FIG. 4, as an example for such an activation function, a rectifier linear unit (ReLU), that is max(x, 0), for example, is shown, but also other activation functions such as sigmoid, tanh, softmax, leaky ReLU etc. can be implemented.

It is to be noted that according to examples of embodiments, as input data 400, sequences reflecting a variety of network states are applied. For example, the input 400 reflects how users of the communication network are spatially distributed and how their spatial distribution evolves over time. For example, as one example of an input sample, an image is prepared where the position of each pixel corresponds to a geographical grid or physical location.

Then, an intensity or color value of each pixel is set so as to correspond to a determined level of user activities or user demands (such as requested quality of service, required bandwidth or the like) aggregated over the geographical grid at a certain time. As a further development, the temporal correlation is captured by defining each input sample as a sequence of images captured over successive time snapshots. As a result, according to examples of embodiments, as input data, images (or a 2D matrix) or image sequences (or a 3D matrix) that captures spatially and temporally dependent network states are used.

The convolutional layers 410 and 420 are used to capture the spatial and temporal network environment dependencies, while the fully connected layers 430 and 440 are used to reduce the dimension to a desired output dimension. Outputs are actions related to an optimization of parameters and policies of the observed networks, for example.

From the network rewards (e.g. a positive reaction) or losses (e.g. a negative reaction), which may also indicate that no reaction at all is observable, are returned to the DLR network. For example, rewards are indicated by KPIs. The rewards (or losses) are used by the DLR network for learning, e.g. for updating or modifying a parameter or value used for the respective action (i.e. a respective value of Q, for example).

According to examples of embodiments, it is assumed that a network optimization model based, for example, on a DLR network is trained in one or more parts of a communication network capable of self-organizing parameters and settings thereof, such as in a SON network as shown in FIG. 1. In other words, one or more network optimization models are established and trained in parts of an existing network structure or system. That is, a corresponding DRL model is trained in an existing system, wherein "system" can refer to any network element or part, such as a base station, a WiFi access point, a pico/femto cell or the like, or a sub-network or partial network consisting of a plurality of network elements or functions, such as one or more macro cells.

Furthermore, according to examples of embodiments, at least parts of the trained network optimization model are transferred to network control elements or functions which are responsible for settings of network properties or the like in "new" network parts, i.e. in newly established or recently modified network parts of the communication network (e.g. the SON network). That is, for example, knowledge embedded in the pre-trained network optimization model, such as in the convolutional neural network parts, is exploited in the new or modified network parts.

For example, usable knowledge embedded in the pre-trained network optimization model such as in the convolutional neural network parts which is to be exploited in the new or modified network parts comprise a set of model parameters (e.g., weight matrices, bias vectors) and hyper-parameters (e.g., number of layers, number of units at each layer, type of the activation function). In order to exploit the knowledge that is obtained from a previously existing system and to transfer it to a new system, according to examples of embodiments, a part of or all of pre-trained parameters and hyperparameters (e.g., those characterizing lower layers of DRL model) are transferred.

According to examples of embodiments, layers of the model which are to be transferred can be selected based on suitable selection criteria. One example for such selection criteria is represented by a similarity measure between network parts to be considered, i.e. between relevant parts of the existing system (i.e. where the model is pre-trained) and corresponding parts of the new system. For example, a high similarity can be assumed when network element (like a BS) of the same type are compared.

In order to adapt the network optimization model to the new system, according to some examples of embodiments, at first the (transferred) model is adapted in a suitable manner. For example, depending on the situation in the new network part, layers (e.g. new convolutional layers) are added to the network, or existing layers are modified, e.g. the output layer (e.g. the fully connected layer 440). Then, the modified model is retrained by using measurements in the new network part; alternatively or additionally, only newly inserted layers can be retrained, if suitable.

According to other examples of embodiments, the procedure includes, e.g. in case of a lack of real measurements, to collect data from a "virtual" digital system which is configured to mimic a real network scenario. For example, complex system-level simulators based on approximations are usable for such a virtual simulation. Then, a corresponding network optimization model, such as a DRL model as indicated above, is trained in order to optimize the simulated system. Based on the thus obtained pre-trained model, after transfer thereof to a new network part, real measurements in the new network part are used for fine-tuning.

Advantage achievable by the above indicated procedure using a pre-trained model in a new system or network part comprise, for example, that the training/retraining of the new/modified layers/model is possible with a small number of measurements collected from the new system. That is, a smaller amount of measurements and hence data is required compared to a scenario where transfer learning is not employed. Furthermore, considering a case where the "existing" system is simulated, adapting and correcting the approximated model to the real scenario is achieved faster and also with only a limited number of measurements.

In the following, further explanations regarding network optimization using a DRL model are provided.

As described above, FIG. 4 shows a schematic diagram illustrating a DRL process usable according to some examples of embodiments. An algorithm usable for this DRL process is based, for example, on a training algorithm for deep Q-networks. Here, an agent selects and executes actions according to a greedy policy based on Q. It is possible to use histories of an arbitrary length as inputs, or a fixed length representation of histories can be employed. In the present example, a model is used which is based on a DRL network to learn successful policies directly from e.g. sensory inputs for the purpose of network optimization. Specifically, the employed DRL model learns the mapping between the network environment measurements as inputs and the optimization actions/decisions as outputs. Corresponding system performance indicators are then mapped as rewards.

As shown in FIG. 4, the DRL model consists of at least convolutional layers and fully connected layers, where the convolutional layers are used to capture the temporal and spatial correlations of the network environment, while the fully connected layers are used for reducing the dimension to the required dimension of the output actions.

The DRL model reflects how the optimization agent interacts with the network environment through a sequence of actions and observed rewards. The goal of the agent is to select actions that maximize the cumulative expected reward. More specifically, the DRL network is used to approximate an optimal action-value function $$Q^*(s, a) = \max_{\pi} \mathbb{E}_{\pi} \left[ \sum_{n=0,1,...} \gamma^n r_{t+n} | s_t = s, a_t = a, \pi \right] \quad (1)$$

which represents the maximum sum of rewards $r_t$ discounted by $\gamma$ at each time step t, achievable by a behavior policy $\pi$=P(a|s), after making a network state observation s and taking an action a.

The above optimal action-value function obeys the Bellman equation based on the intuition of recursion: if the optimal value Q*(s', a') at the next time step was known for all possible actions a', then the optimal strategy is to select the action a' maximizing the expected value of r+$\gamma$Q*(s', a'):

$$Q^*(s, a) = \mathbb{E}_{s'} \left[ r + \gamma \max_{a'} Q^*(s', a') | s, a \right] \quad (2)$$

In the following, examples of inputs, outputs, and rewards of a DRL network usable in examples of embodiments are indicated.

For example, as inputs (implying network states), values are used which represent the main factor of the network environment state, i.e. user activity/demand distribution. For example, it is assumed that the user location can be at least coarsely estimated, either by using GPS information obtained from a location service, or estimated by using a base station ID and received arrival signal. The latitude-longitude coordinate is converted, for example, into a pixel coordinate. Then, at the t-th time snapshot, a matrix expressing the user activity/demand map is generated where the intensity at each pixel is the measure of the user activities, e.g. data rate demand or quality of service class identifier (QCI). That is, for example, a map or an image is provided where the position of each pixel corresponds to the geographical location and an intensity (or color value) of each pixel corresponds to a level of user activity or user demands (such as requested quality of service, required bandwidth or the like).

For example, the matrix is denoted by $X_t \in \mathbb{R}^{N_u \times N_v}$, where $N_u$ and $N_v$ denote the number of pixels of the two-axis converted from the latitude and longitude coordinate, respectively. Moreover, besides the user activity map, the matrix can also be extended to a multi-channel matrix to capture more network environment information, such as signal strength radio map. For example, a matrix $X_t \in \mathbb{R}^{N_u \times N_v \times 2}$ can be formed where the first $N_u \times N_v$ submatrix along the third dimension $X_t(:,:,1)$ (it is to be noted that a MATLAB matrix notation is used for the sake of simplicity for denoting the entries of a matrix) implies the user activity map, while the second submatrix along the third dimension $X_t(:,:,2)$ refers to the radio signal map. Each training input sample can be defined as matrix (or a multi-channel matrix) $X_t$. By passing them through the convolutional layer the spatial correlation can be captured. A temporal correlation can be captured by defining the input training sample as a sequence of the matrices $\{X_\tau : \tau = t-T+1, \ldots, t\}$ over T successive time snapshots $\tau = t-T+1, \ldots, t$. To summarize, the m-th sample it denoted by $X^{(m)}$, wherein then the two alternatives of input training samples are:

$X^{(m)} := X_{t_m}$ to capture the spatial correlation only for the $t_m$-th time snapshot, where $X_{t_m} \in \mathbb{R}^{N_u \times N_v \times K}$ and K is the number of considered network environment variables (e.g., user activity, or radio signal strength) that affect the system performance. Each input training sample is a $N_u \times N_v \times K$ image.

$X^{(m)} := \{X_\tau : \tau = t_m - T+1, \ldots, t_m\}$ to capture both the spatial and temporal correlation over T successive time snapshots. In this case, each input sample is a $N_u \times N_v \times (K \cdot T)$ image implying the values of selected network environment variables across spatial and time domain.

That is, as described above, according to examples of embodiments, as input for a network optimization model (i.e. input data 400 in FIG. 4, for example), images (or a 2D matrix) and/or image sequences (or a 3D matrix) representing spatially or spatially/temporally dependent network states are obtained so that it can be evaluated how users of a communication network part are spatially distributed, how their spatial distribution evolves over time, what demands and behavior do they show over time, and the like.

For example, an inference (or a prediction) model may be learned that captures a spatial dependence alone. In this case, the set of input samples is a set of images, and each sample is an image (i.e. a 2D array) where a position of each pixel corresponds to a geographical grid or physical location of users and an intensity or color value of each pixel corresponds to a user state metric (e.g. user activity level or user traffic demand) aggregated over the geographical grid at a specific time period. Namely, each image implies a user state map (e.g., user activity map or traffic demand map).

As another example, it is possible, for example, to learn a model that captures both spatial and temporal dependence. In this case, a set of input samples is a set of multiple sequences of snapshot images, and each sample is a sequence of snapshot images (i.e. a 3D array) that indicates the evolution of the user state map over a period of time.

Furthermore, as another example, input data can include different forms of data, i.e. 2D and 3D data sets, as discussed above.

Furthermore, with regard to outputs (implying the predicted Q values corresponding to actions), the output layer is a fully connected linear layer (e.g. layer 440 in FIG. 4) with an output vector of the Q value (see Eqn. (2)) for all valid network optimization actions.

For example, a discrete network action space is defined over the selected network control parameters. As an example, without being limited thereto, the following control parameters can be defined:

transmit power level $p \in \mathcal{P} := \{low, medium, high\}$, multiple input multiple output (MIMO) mode $d \in \mathcal{D} := \{2 \times 2, 4 \times 4\}$, frequency bands $b \in \mathcal{B}$ {800 MHz, 2.4 GHz, 5 GHz, 60 GHz}.

Then, the action space is $\mathcal{A} := \mathcal{P} \times \mathcal{D} \times \mathcal{B}$ and there are $|\mathcal{P}| \cdot |\mathcal{D}| \cdot |\mathcal{B}| = 3 \cdot 2 \cdot 4 = 24$ possible actions, and the output is a vector $y \in \mathbb{R}^{24}$. This output is a vector of the Q Another option is that, instead of forming empirical searching space of the control parameters, some of the action subspaces are defined on the basis of the tuning directions, e.g., $\Delta p = \{+\delta_p mW, -\delta_p mW\}$, $\Delta_d = \{+2 \times 2$ antenne, $-2 \times 2$ antenne$\}$. The cardinality of the action space $\mathcal{A} := \Delta_p \times \Delta_d \times \mathcal{B}$ is reduced to $|\Delta_p| \cdot |\Delta_d| \cdot |\mathcal{B}| = 2 \cdot 2 \cdot 4 = 16$. In case multiple variables with many possible configuration values are present, the output state space can be decreased by defining some of the action subspaces on the basis of the tuning directions. Moreover, it is also possible to include the actions from neighboring network elements (e.g. neighboring cells) to incorporate the interaction between multiple agents. In this case, the output state space is of course enlarged.

Moreover, with regard to the rewards, according to examples, the resulting performance metrics corresponding to the actions are considered in the rewards. For example, without being limited thereto, the following policies for defining rewards can be provided:

- a continuous value for a target key performance indicator (KPI), e.g., the service success rate.
- a quantified measure for multiple KPIs. Since KPIs may have different scales, according to some examples of embodiments, the KPIs are normalized to the same scale and a weighted sum is obtained.
- simplified feedback; in this case, all positive rewards are indicated by "1" and all negative rewards (losses) are indicated by "−1". The unchanged performance is left as "0". Alternatively, the magnitude of the performance is differentiated, so that more quantified levels of positive and negative performance can be added.

As an example, based on the above indicated inputs, outputs and rewards, the DRL network used for providing the network optimization model provides an approximation of $Q^*(s, a)$, i.e., $Q(s, a;\theta) \approx Q^*(s,a)$ where $\theta$ is the parameter set characterizing the DRL network (e.g., weight matrices and bias vectors). The DRL network can be trained e.g. by adjusting the parameter $\theta_i$ at each iteration i to reduce a mean-squared error in the Bellman equation as indicated in Eqt. (2), where the optimal target values $$r + \gamma \max_{a'} Q^*(s', a')$$

are substituted with approximated target values $$y = r + \gamma \max_{a'} Q(s', a'; \theta_i^-),$$

where $\theta_i^-$ denotes the parameters from some previous iteration, for example, we can set $\theta_i^- = \theta_{i-1}$. This leads to a sequence of loss functions $L_i(\theta_i)$ that changes at each iteration i, written as $$L_i(\theta_i) = \mathbb{E}_{s,a,r,s'}[(y - Q(s,a;\theta_i))^2] \quad (3).$$

With the above loss function in Eqt. (3), it is possible to update the parameters $\theta_i$ at each iteration i using e.g. a gradient descent algorithm.

By using the above described or a similar processing, it is possible to train a DRL model for an existing system in order to achieve a network optimization. In the next phase, knowledge of this trained model is to be transferred to a new (or modified) network part or system of the self-organizing network.

In the following, measure usable in examples of embodiments for transferring the knowledge are described, in particular with regard the questions what knowledge is to be transferred, what elements or functions shall receive the knowledge, how can the amount of knowledge to be transferred be determined, and how can the transferred knowledge (i.e. the transferred model) be adapted in the new network part or system.

As indicated above, the DRL model has knowledge learned at different layers. For example, at low/medium layers, the DLR model learns the designed reward (or loss) in response to the actions depending on the local edges and local shapes of the input maps (e.g., user demand map or/and radio signal map). On the other hand, at the high layers, the model learns the dependence of the reward (or loss) on the higher level statistical data features, e.g., the demand distribution.

Therefore, according to examples of embodiments, it is useful to retain the knowledge in the low/medium layers of the model and to fine-tune or modify the high layers when being applied to a new system.

On the basis of this approach, in the following, examples for potential knowledge transfer strategies according to some examples of embodiments are described.

With regard to the question what knowledge is to be transferred, assume a pre-trained DRL model obtained in the existing system (e.g. BS 20 of FIG. 1), wherein the parameters and the hyperparameters of the model are saved in a data file. To give an example of the parameters and the hyperparameters, the parameters are referred to the weight matrices and bias vectors between each two successive layers, and the hyperparameters include learning rate, number of hidden layers and units, number of the filters and filter size in each convolutional layer, stride size of each maximum (or average) pooling layer, and the activation function.

For example, suppose L layers are defined, then a collection of parameters and hyperparameters for the l-th layer can be defined as $\Theta^{(l)}$, l=1, . . . , L (e.g., including parameters such as weight matrix between l-th and (l−1)-th layer $W^{(l)}$, bias vector $b^{(l)}$, and hyperparameters such as type of the layer $T^{(l)}$, number of the units of the layer N, filter size $S_f^{(l)}$, stride size $S_l^{(l)}$). Furthermore, the set of the general hyperparameters of the model is denoted by $\mathcal{H}$ (e.g., including learning rate $\alpha$, loss function F, batch size $S_b$, activation function A). Then, according to some examples of embodiments, a subset of the parameters and hyperparameters that characterizes the low/medium layers of the pretrained DRL model $\{\Theta^{(1)}, \ldots, \Theta^{(K)}\}$ where K≤L and the general hyperparameter set $\mathcal{H}$ is transferred.

Concerning the question what elements or functions shall receive the knowledge, and how can the amount of knowledge to be transferred be determined, according to some examples of embodiments, the following processing is applied. That is, in order to decide the number of e.g. the low/medium layers to transfer from an existing system (e.g. the BS 0 of FIG. 1) to a new system (e.g. one of the BS 40, 50, 60 of FIG. 1), a knowledge transfer strategy is usable which depends on a similarity analysis between the two systems (i.e. the existing system and the new system).

In detail, this approach considers the following. The higher the similarity between two systems is, the more similar the two network models are, and thus the more layers can be transferred. For example, a similarity between two systems is defined on the basis of network properties, such as location, geographical features, mobility patterns, and data demand statistics. Basically, there are two types of network properties: single data point (can be multi-dimensional) such as location or size of the network, and a statistical measure (e.g., histogram approximating probability density functions) such as mobility pattern or data demand distribution. The similarity between corresponding single data points (together composing e.g. a high dimensional vector) can be computed, for example, by suitable distance measures, such as $l_p$-metric, e.g. a power(p,r)-distance measure $$\left(\sum_{i=1}^n |x_i - y_i|^p\right)^{1/r}.$$

It is to be noted that according to some examples of embodiments the inputs are to be normalized before computing the distance measures, because the n variables may have different units and scales.

On the other hand, the distance between the approximated probability density functions can be computed with the distance measure of the distribution functions, such as Kullback-Leibler divergence, i.e., $$D_{KL}(P\|Q) = -\sum_{i=1}^{n} P_i \log \frac{q_i}{P_i},$$

where $(p_1, \ldots, p_n)$ and $(q_1, \ldots, q_n)$ are the histograms extracted from a certain class of measurements of the existing and new system, respectively. Then, a weighted sum is used to compute the combined metric of various similarity measures between various network properties of the two systems.

Based on the result of the similarity analysis, i.e. for example the determined metric of various similarity measures, systems (i.e. network parts) having (at least) a pre-determined level of similarity are selected to be provided with data corresponding to the pre-trained model. For example, according to examples of embodiments, in case a determined similarity level reaches a minimum level (such as a preset threshold or the like), the corresponding system or network part is determined to have sufficient similarity to an existing system or network part for which a pre-trained model is available. Then, the system with a sufficiently high similarity measure receives (at least a part of) the pre-trained model from the existing system by means of a model transfer.

According to examples of embodiments, the amount of data to be transferred, i.e. the parts of the pre-trained model which shall be provided to the new (or modified) system can be determined as follows. For example, in order to find out which layers of the existing model are to be transferred, a dependency between similarity level and amount of data can be defined. One option is, for example, to design a monotone non-decreasing function such as $f: \mathbb{R} \to \{1, \ldots, L\}$ that maps the similarity measure to the number of layers, e.g., a step function. Another option is, for example, to discretize the similarity measure, and to define a look-up table so as to map the output (number of layers) with the input (similarity level).

Regarding the question how the transferred model is to be adapted in the new system, according to examples of embodiments, the transferred model parts are fine-tuned or updated in the new system (e.g. in the new BS 50 etc.). For example, the layers being part of the transferred model are modified, or the model is changed e.g. by adding higher layers to the received pre-trained model. Then, the inserted or modified layers are (re-) trained, e.g. on the basis of collected training samples from the new system. According to examples of embodiments, the operations of fine-tuning and updating can be achieved, for example, by using a known transfer learning approach. For example, a corresponding transfer learning can be classified into three different settings: inductive transfer learning, transductive transfer learning and unsupervised transfer learning, and further classified into four contexts based on "what to transfer" in learning, including an instance-transfer approach, a feature-representation-transfer approach, a parameter transfer approach and a relational-knowledge-transfer approach, respectively.

In the following, examples of embodiments regarding a procedure for optimizing a self-organizing network based on the above discussed measures are described with reference to FIGS. 2 and 3.

Figure 2:
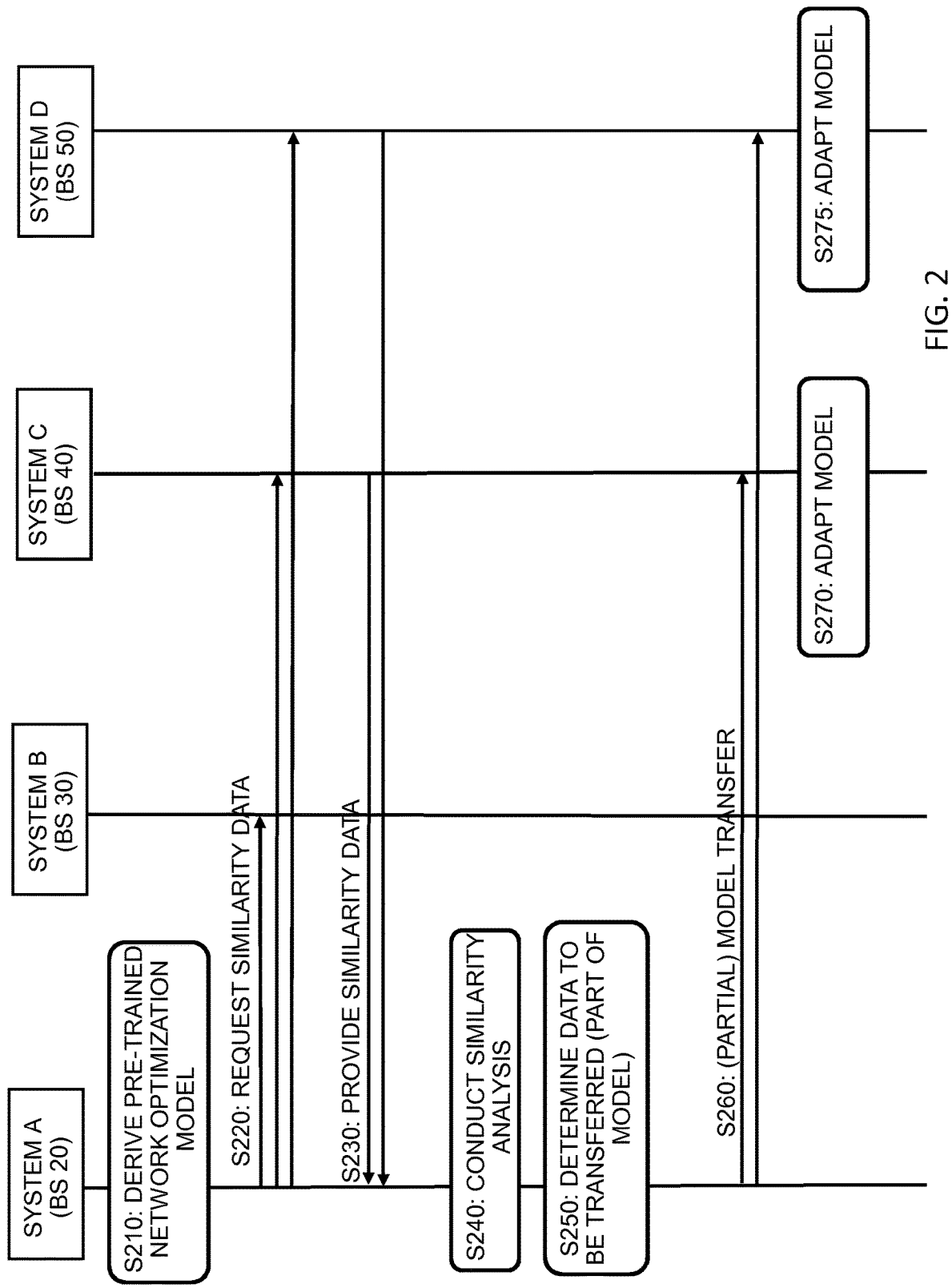
FIG. 2 shows a signaling diagram illustrating a processing for a network optimization approach according to examples of embodiments.

Specifically, FIG. 2 is related to a case where a so-called distributed self-transfer optimization network is employed, wherein for illustrative purposes a communication network structure as shown in FIG. 1 is used. However, it is to be noted that principles described in the example below are also applicable to other network configurations, as indicated above.

In the example according to FIG. 2, it is assumed that the network part belonging to BS 20 is already operating so that a corresponding network optimization model is trained, e.g. as described above. Furthermore, it is assumed that the network part belonging to the BS 30 is also in operation, i.e. has an own network optimization model or does not require such a model. On the other hand, other network parts, such as that belonging to BS 40 and BS 50, are newly implemented or modified so that a network optimization model is required or usable thereby. It is to be noted that in the distributed scheme discussed in connection with FIG. 2 the central unit 60 shown in FIG. 1 is not relevant for the process flow.

As shown in FIG. 2, in a fully distributed scheme of the self-transfer optimization, each system having a sufficient data collection derives a pre-trained DRL model for network optimization. That is, in the example under consideration, the BS 20 derives the pre-trained network optimization model in S210, e.g. in accordance with the above described processing.

When the network optimization model is sufficiently prepared, in S220, BS 20 as the system with the pre-trained model sends a request message to connected (wired or wireless) systems to notify these systems that it has a pre-trained model. As shown in FIG. 2, the message in S220 is sent, for example, to BS 30, BS 40 and BS 50. According to examples of embodiments, the indication that a pre-trained model is available is presented by means of a transmission of a request for similarity data from the connected systems. The similarity data are required for executing the similarity analysis, such as network property data or the like. Alternatively, the indication that a pre-trained model is available and the request for similarity data are provided in separate signaling.

In S230, the systems which have received the message in S220 respond to the requesting BS 20. For example, systems receiving the request and having no pre-trained model themselves, such as the new systems related to BS 40 and BS 50, respond to the request with the similarity data requested for the similarity analysis between two systems. Otherwise if a system has a pre-trained model itself or does not need a model, such as the (already operating) system for BS 30, send only an indication that the similarity data request has been received, such as a single bit for acknowledgement, in order to reject the request.

In S240, the system offering the pre-trained network optimization model, i.e. BS 20, after having received the similarity data (or the acknowledgement/rejection), operates as follows. For those systems for which similarity data have been received, the similarity analysis is executed. On the basis of the similarity analysis, in S250, the parts of the pre-trained network optimization model to be transferred to the corresponding systems are determined, i.e. it is determined which layers of the model are to be transferred to BS 40 and BS 50.

On the other hand, since e.g. from BS 30 only a receipt acknowledgment has been obtained, no similarity analysis is performed in S240.

On the basis of the result of the processing in S250, the system having the pre-trained model (i.e. BS 20) sends, in S260, the determined parts of the model (e.g., a number of the lower/medium layers) to those systems where the similarity analysis had been performed (i.e. on the basis of the similarity measure thereof).

The systems receiving the (partial) pre-trained network optimization model, i.e. BS 40 and BS 50 in FIG. 2, adapt the received model according to their needs (see S270 and S275). That is, for example, the model is fine-tuned or updated on the basis of own collected data using transfer learning.

Figure 3:
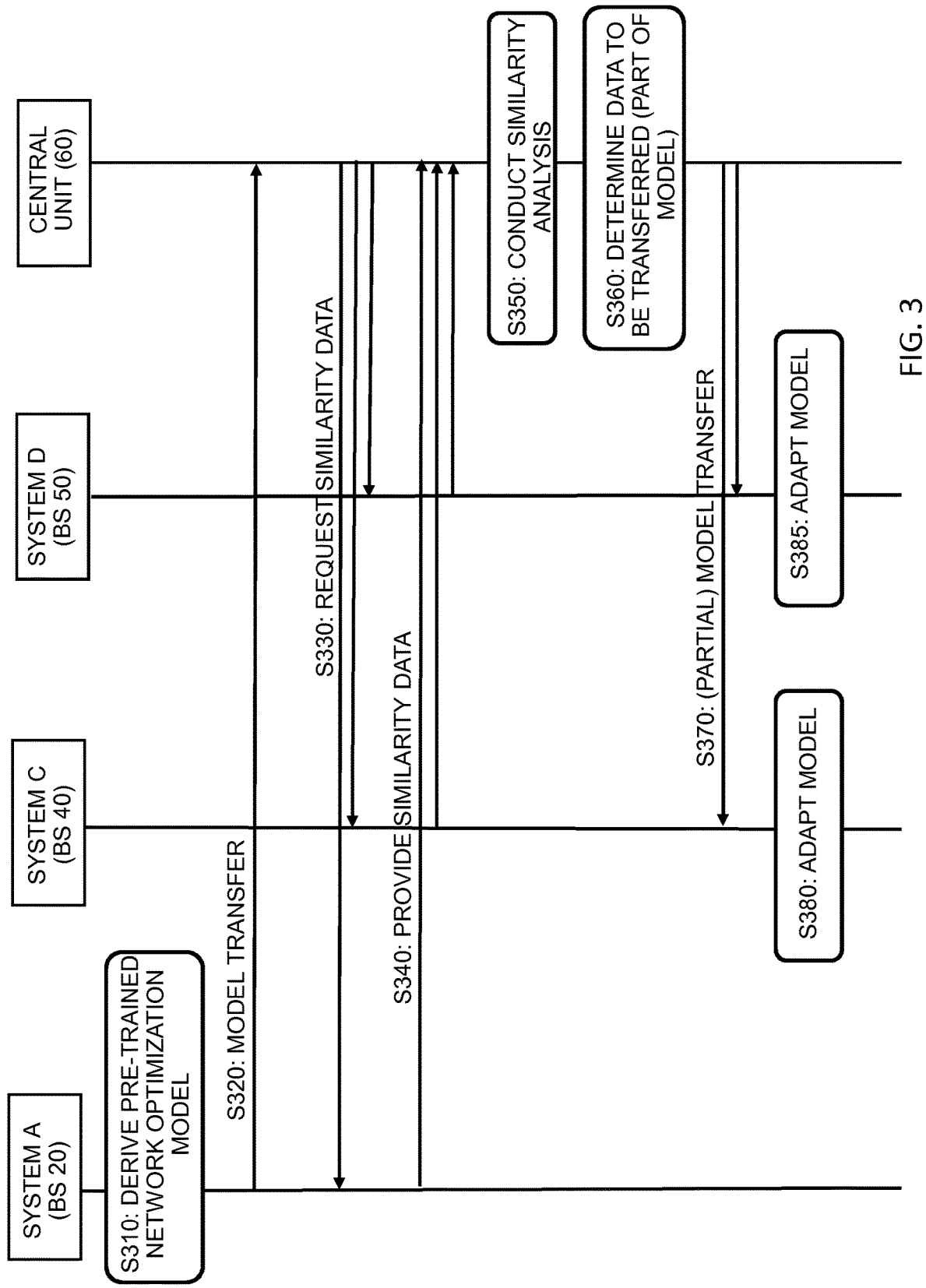
FIG. 3 shows a signaling diagram illustrating a processing for a network optimization approach according to examples of embodiments.

With regard to FIG. 3, as a further example of embodiments, a scenario is described which is related to a case where a so-called centralized or hierarchical self-transfer optimization network is employed, wherein for illustrative purposes again a communication network structure as shown in FIG. 1 is used. However, it is to be noted that principles described in the example below are also applicable to other network configurations, as indicated above.

In the example according to FIG. 3, it is again assumed that the network part belonging to BS 20 is already operating so that a corresponding network optimization model is trained, e.g. as described above. Furthermore, even though not explicitly indicated in FIG. 3, it is assumed that the network part belonging to the BS 30 is also in operation, i.e. has an own network optimization model or does not require such a model. On the other hand, other network parts, such as that belonging to BS 40 and BS 50, are newly implemented or modified so that a network optimization model is required or usable thereby. In contrast to the example of FIG. 2, in the configuration according to FIG. 3, also the central unit 60 shown in FIG. 1 is involved in the processing, as described below.

In the centralized scheme of the self-transfer optimization, each system having a sufficient data collection derives a pre-trained DRL model for network optimization. That is, in the example under consideration, the BS 20 derives the pre-trained network optimization model in S310, e.g. in accordance with the above described processing.

In S320, when the network optimization model is sufficiently prepared, BS 20 sends the pre-trained model to a central unit 60. In the example discussed in connection with the centralized scheme, the central unit 60 is in charge of collecting pre-trained models from connected systems (i.e. BSs in the example of FIG. 1). A further purpose of the central unit 60 is to as well as redistribute the model to systems that do not have any pre-trained model. For example, the central unit 60 can be part of a network element or function, such as an access network system element, a core network element or function, an element or function of a OSS of the network, or a specified element or function used for this purpose, e.g. a server or the like.

When at least one pre-trained network optimization model is available in the central unit 60, the central unit 60 starts performing a similarity analysis. For this purpose, in S330, the central unit 60 sends a request message to connected (wired or wireless) systems to notify these systems that a pre-trained model is available.

According to examples of embodiments, the indication that a pre-trained model is available is presented by means of a transmission of a request for similarity data from the connected systems. As described above, the similarity data are required for executing the similarity analysis, such as network property data or the like. As shown in FIG. 3, the message in S330 is sent, for example, to BS 20, BS 40 and BS 50. That is, according to examples of embodiments, similarity data are also requested from the system from which the pre-trained model is received. Alternatively, corresponding data can be provided by the model providing system automatically, e.g. in connection with the provision of model data in S320.

In S340, the systems which have received the message in S330 respond to the central unit 60 by sending the similarity data.

In S350, the central unit 60, after having received the similarity data, executes the similarity analysis. It is to be noted that according to some examples of embodiments, if some of the connected systems (such as the system belonging to BS 30 (not shown in FIG. 3)) do not need a pre-trained model, these systems can be excluded by the similarity analysis.

On the basis of the results of the similarity analysis, in S360, the parts of the pre-trained network optimization model being received in S320 which are to be transferred to the corresponding systems (here, BS 40 and BS 50) are determined, i.e. it is determined which layers of the model are to be transferred to BS 40 and BS 50.

On the basis of the result of the processing in S360, the central unit 60 sends, in S370, the determined parts of the model (e.g., a number of the lower/medium layers) to those systems where the similarity analysis had been performed (i.e. on the basis of the similarity measure thereof).

The systems receiving the (partial) pre-trained network optimization model, i.e. BS 40 and BS 50 in FIG. 3, adapt the received model according to their needs (see S380 and S385). That is, for example, the model is fine-tuned or updated on the basis of own collected data using transfer learning.

Figure 5:
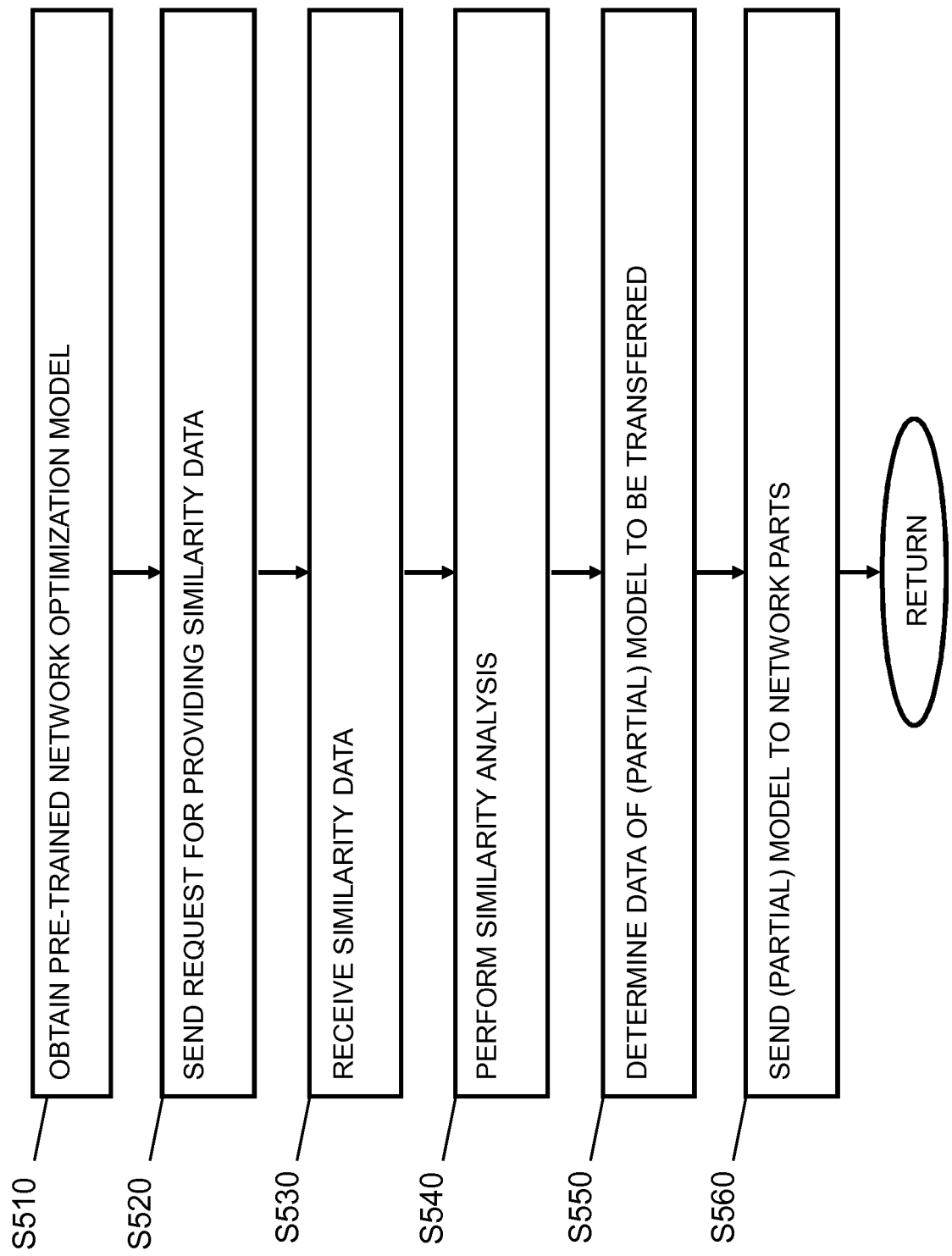
FIG. 5 shows a flow chart of a processing conducted in a network optimization approach according to examples of embodiments.

FIG. 5 shows a flow chart of a processing conducted in a network optimization approach according to examples of embodiments. Specifically, FIG. 5 shows a processing executed by a communication network control element or function of a self-organizing communication network, such as the BS 20 or the central unit 60, which is configured to control the distribution of the network optimization model to new network parts.

In S510, a pre-trained network optimization model indicating a mapping between a communication network environment forming an input of the model, optimization actions or decisions forming an output of the model, and system performance indicators forming a reward is obtained.

According to some examples of embodiments, e.g. in case of a centralized scheme as described in connection with FIG. 3, the pre-trained network optimization model is obtained by receiving data including the pre-trained network optimization model from a communication network element or function belonging to a part of the self-organizing communication network. This is done by a central unit being in charge of collecting and managing usage of pre-trained network optimization models derived in the self-organizing communication network.

Alternative, according to some examples of embodiments, e.g. in case of a distributed scheme as described in connection with FIG. 2, the pre-trained network optimization model is obtained by deriving the pre-trained network optimization model from data and measurements conducted in an own part of the self-organizing communication network, wherein this is done in a communication network element or function forming a part of a distributed system for managing usage of pre-trained network optimization models derived in the self-organizing communication network, such as BS 20.

For example, according to examples of embodiments, for deriving the pre-trained network optimization model, input data are prepared by determining how users of the communication network part are spatially distributed in the part of the self-organizing communication network and how the spatial distribution of the users evolves over time. Furthermore, a user activity level of the users in a specified time period is determined. Then, on the basis of the determined data, an input sample is generated including at least one of an image (e.g. a 2D matrix) and a sequence of images (e.g. a 3D matrix) in which a position of each pixel corresponds to a geographical grid or physical location of the users and an intensity or color value of each pixel corresponds to a user activity level aggregated over the geographical grid at the specified time period.

According to examples of embodiments, the pre-trained network optimization model is derived by using a DRL algorithm based on a plurality of convolutional layers employed for capturing spatial and temporal correlations between the network environment of the part of the self-organizing communication network, and a plurality of fully connected layers employed for reducing dimensions of data processing in the plurality of convolutional layers to a desired output dimension, wherein the pre-trained network optimization model is defined by a set of model parameters and hyperparameters. For example, the model parameters include at least one of weight matrices between each two successive layers of the plurality of convolutional layers and the plurality of fully connected layers, and bias vectors between each two successive layers of the plurality of convolutional layers and the plurality of fully connected layers, and the hyperparameters include at least one of a number of layers of the plurality of convolutional layers and the plurality of fully connected layers, a number of units at each layer of the plurality of convolutional layers and the plurality of fully connected layers, a type of an activation function, a number of filters and filter size in each of the plurality of convolutional layers, a stride size of each maximum or average pooling layer.

In S520, a request for providing similarity data is sent to at least one connected communication network element or function forming a part of the self-organizing communication network. The similarity data are for a similarity analysis allowing to determine a similarity between a part of the self-organizing communication network for which the pre-trained network optimization model is derived (e.g. the part belonging to BS 20) and a part of the self-organizing communication network of the at least one communication network element or function to which the request is sent, According to some examples of embodiments, the request for providing similarity data for a similarity analysis caused to be sent to at least one communication network element or function forming a part of the self-organizing communication network is included in an indication that a pre-trained network optimization model is present.

In S530, similarity data are received. As indicated in connection with FIGS. 2 and 3, the similarity data are received from those network parts which require a pre-trained network optimization model, such as BS 40 and BS 50, wherein in case of the centralized scheme using the central unit 60 similarity data are also received from the network part in which the network optimization model is trained (i.e. BS 20).

Then in S540, the similarity analysis is performed for determining a similarity between the part of the self-organizing communication network for which the pre-trained network optimization model is derived and each part of the self-organizing communication network for which similarity data for the similarity analysis are received, According to examples of embodiments, for performing the similarity analysis for determining the similarity between the part of the self-organizing communication network for which the pre-trained network optimization model is derived and a part of the self-organizing communication network for which similarity data for the similarity analysis are received, a similarity measure is calculated on the basis of network properties of the part of the self-organizing communication network for which the pre-trained network optimization model is derived and the part of the self-organizing communication network for which similarity data for the similarity analysis are received. The network properties being used for this purpose comprise, for example, data related to a single data point and data related to statistical measures and include at least one of location information, geographical features, mobility patterns, data demand statistics, and histograms approximating a probability density function.

In S550, on the basis of the similarity analysis, at least a part of the pre-trained network optimization model to be provided to the at least one communication network element or function forming a part of the self-organizing communication network from which the similarity data are received is determined. According to examples of embodiments, for determining at least a part of the pre-trained network optimization model to be provided to the at least one communication network element or function forming a part of the self-organizing communication network from which the similarity data are received, the calculated similarity measure is processed. Then, for forming the part of the pre-trained network optimization model to be provided, a subset of parameters and hyperparameters defining low and medium layers of the pre-trained network optimization model is selected, wherein the higher the similarity between the part of the self-organizing communication network for which the pre-trained network optimization model is derived and the part of the self-organizing communication network for which similarity data for the similarity analysis are received is according to the similarity measure, the higher the number of parameters and hyperparameters selected for the subset becomes.

In S560, the determined part of the pre-trained network optimization model is sent to the at least one communication network element or function forming a part of the self-organizing communication network from which the similarity data are received.

Figure 6:
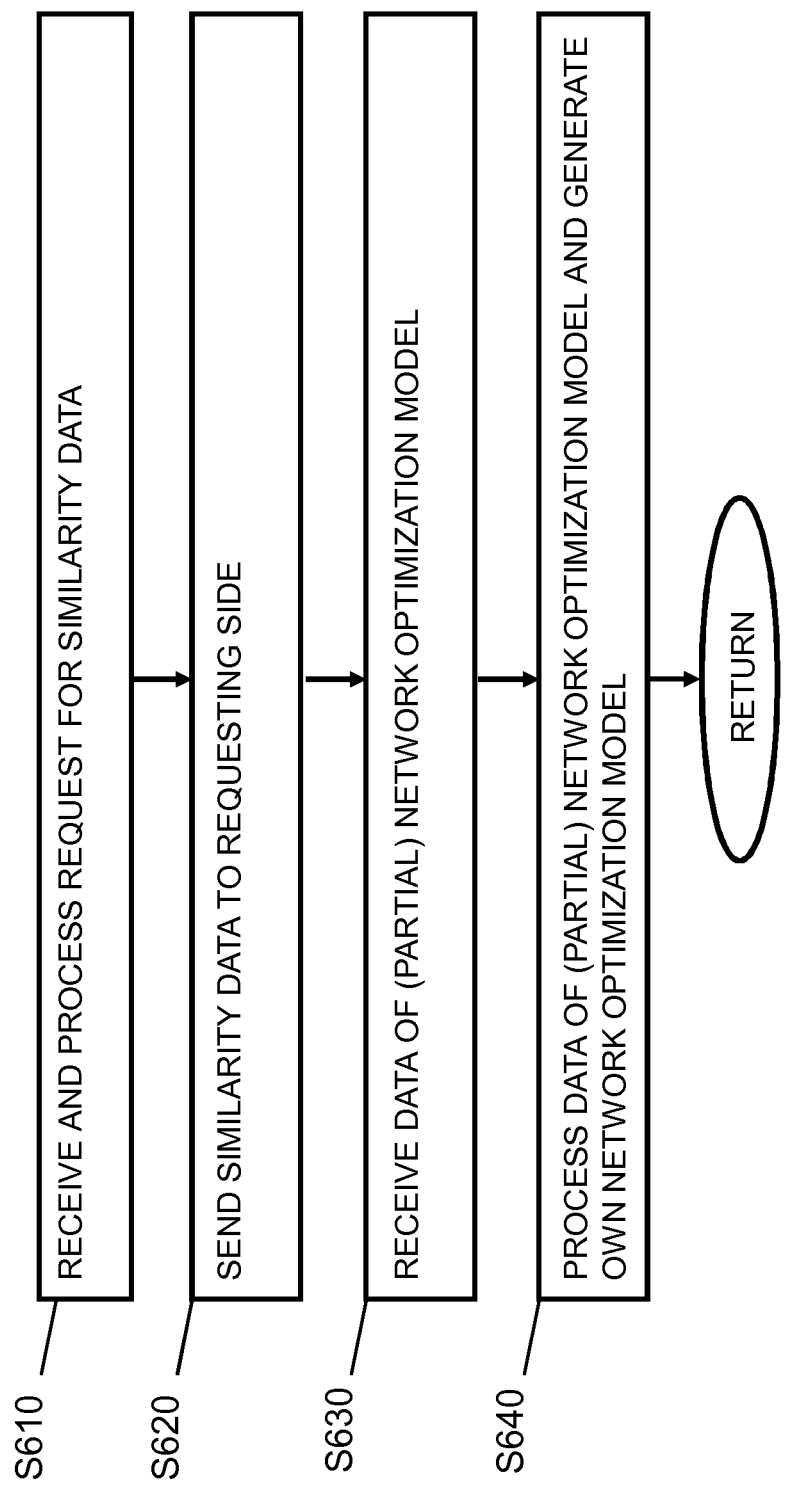
FIG. 6 shows a flow chart of a processing conducted in a network optimization approach according to examples of embodiments.

FIG. 6 shows a flow chart of a processing conducted in a network optimization approach according to examples of embodiments. Specifically, FIG. 6 shows a processing executed by a communication network element or function of a self-organizing communication network, such as the BS 40 or BS 50, which is configured to receive and process (at least parts of) a pre-trained network optimization model for preparing an own network optimization model.

In S610, a request for providing similarity data for a similarity analysis allowing to determine a similarity between parts of the self-organizing communication network is received from a communication network control element or function forming a part of the self-organizing communication network (e.g. BS 20 or central unit 60) and processed, According to examples of embodiments, the request for providing similarity data for the similarity analysis is received from a central unit being in charge of collecting and managing usage of pre-trained network optimization models derived in the self-organizing communication network. Alternatively, according to examples of embodiments, the request is received from a communication network element or function deriving the pre-trained network optimization model and forming a part of a distributed system for managing usage of pre-trained network optimization models derived in the self-organizing communication network. It is to be noted that according to examples of embodiments, the request for providing similarity data is included in an indication that a pre-trained network optimization model is present.

In S620, it is decided whether the similarity data are required to be sent. For example, it is checked whether or not a network optimization model is already available, i.e. it is checked whether or not an own network optimization model is present. In case the network optimization model is already available, the similarity data are not required to be sent (instead, only an acknowledgement may be sent for indicating that the request is rejected), or provision of a network optimization model is required. In the latter case, i.e. when the decision is affirmative, the requested similarity data are sent to the communication network control element or function from which the request is received (i.e. to BS 20 or the central unit 60), According to some examples of embodiments, the similarity data are related to network properties and comprise data related to a single data point and data related to statistical measures and include at least one of location information, geographical features, mobility patterns, data demand statistics, and histograms approximating a probability density function.

In S630, data indicating at least a part of a pre-trained network optimization model indicating a mapping between a communication network environment forming an input of the model, optimization actions or decisions forming an output of the model, and system performance indicators forming a reward are received.

According to some examples of embodiments, the pre-trained network optimization model is based on a deep reinforcement learning algorithm based on a plurality of convolutional layers employed for capturing spatial and temporal correlations between the network environment of a part of the self-organizing communication network, and a plurality of fully connected layers employed for reducing dimensions of data processing in the plurality of convolutional layers to a desired output dimension, wherein the pre-trained network optimization model is defined by a set of model parameters and hyperparameters. For example, the model parameters include at least one of weight matrices between each two successive layers of the plurality of convolutional layers and the plurality of fully connected layers, and bias vectors between each two successive layers of the plurality of convolutional layers and the plurality of fully connected layers, while the hyperparameters include at least one of a number of layers of the plurality of convolutional layers and the plurality of fully connected layers, a number of units at each layer of the plurality of convolutional layers and the plurality of fully connected layers, a type of an activation function, a number of filters and filter size in each of the plurality of convolutional layers, a stride size of each maximum or average pooling layer.

In S640, the data indicating at least a part of a pre-trained network optimization model for generating an own network optimization model are processed, e.g. by adapting the received pre-trained network optimization model to the own part of the self-organizing communication network. For example, according to examples of embodiments, for processing the data indicating at least a part of a pre-trained network optimization model for generating an own network optimization model, the received part of the pre-trained network optimization model is modified by conducting at least one of adding at least one of a new convolutional layer and a new fully connected layer to the part of the pre-trained network optimization model, modifying at least one convolutional layer and fully connected layer of the part of the pre-trained network optimization model. Then, the modified network optimization model including the added or modified layers is (re-)trained by using measurement data obtained in the own part of the self-organizing communication network.

According to some examples of embodiments, for processing the data indicating at least a part of a pre-trained network optimization model for generating an own network optimization model, at least one of a fine-tuning of the received part of the pre-trained network optimization model and an updating of the pre-trained network optimization model with data collected in the own part of the self-organizing communication network by using transfer learning is conducted.

Figure 7:
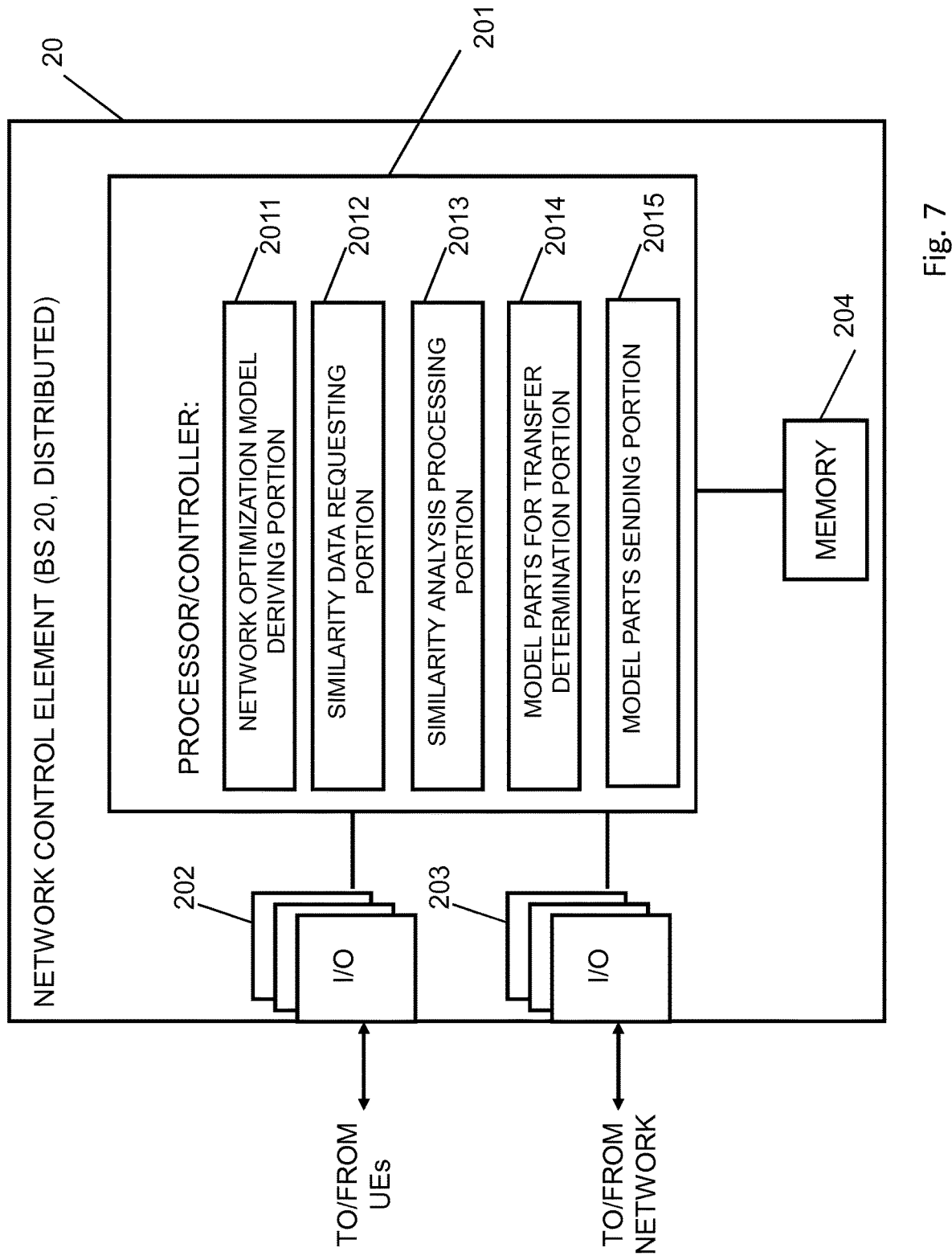
FIG. 7 shows a diagram of a communication network element according to some examples of embodiments.

FIG. 7 shows a diagram of a network element or function acting as a communication network control element or function according to some examples of embodiments, i.e. the BS 20 of FIG. 1, which is communication network control element or function of a self-organizing communication network (e.g. the BS 20) configured to control the distribution of the network optimization model to new network parts in a distributed scheme as described in connection with FIG. 2, for example. It is to be noted that the communication network control element or function, like the BS 20 of FIG. 1, may include further elements or functions besides those described herein below. Furthermore, even though reference is made to a communication network control element or function, the element or function may be also another device or function having a similar task, such as a chipset, a chip, a module, an application etc., which can also be part of a network element or attached as a separate element to a network element, or the like. It should be understood that each block and any combination thereof may be implemented by various means or their combinations, such as hardware, software, firmware, one or more processors and/or circuitry.

The communication network control element like the BS 20 shown in FIG. 7 may include a processing circuitry, a processing function, a control unit or a processor 201, such as a CPU or the like, which is suitable for executing instructions given by programs or the like related to the communication connection control procedure. The processor 201 may include one or more processing portions or functions dedicated to specific processing as described below, or the processing may be run in a single processor or processing function. Portions for executing such specific processing may be also provided as discrete elements or within one or more further processors, processing functions or processing portions, such as in one physical processor like a CPU or in one or more physical or virtual entities, for example. Reference sign 202 and 203 denote input/output (I/O) units or functions (interfaces) connected to the processor or processing function 201. The I/O units 202 may be used for communicating with the UE 10, 11, as described in connection with FIG. 1, for example. The I/O units 203 may be used for communicating with other network elements or functions, such as other BSs like BS 30, 40, 50 and the like, as described in connection with FIGS. 1 and 2, for example. The I/O units 202 and 203 may be a combined unit including communication equipment towards several entities, or may include a distributed structure with a plurality of different interfaces for different entities. Reference sign 204 denotes a memory usable, for example, for storing data and programs to be executed by the processor or processing function 201 and/or as a working storage of the processor or processing function 201. It is to be noted that the memory 204 may be implemented by using one or more memory portions of the same or different type of memory.

The processor or processing function 201 is configured to execute processing related to the above described processing. In particular, the processor or processing circuitry or function 201 includes one or more of the following sub-portions. Sub-portion 2011 is a processing portion which is usable as a portion for deriving the network optimization model. The portion 2011 may be configured to perform processing according to S510 of FIG. 5. Furthermore, the processor or processing circuitry or function 201 may include a sub-portion 2012 usable as a portion for requesting similarity data. The portion 2012 may be configured to perform a processing according to S520 of FIG. 5. In addition, the processor or processing circuitry or function 201 may include a sub-portion 2013 usable as a portion for conducting a similarity analysis. The portion 2013 may be configured to perform a processing according to S530 and S540 of FIG. 5. Moreover, the processor or processing circuitry or function 201 may include a sub-portion 2014 usable as a portion for determining model parts to be transferred. The portion 2014 may be configured to perform a processing according to S550 of FIG. 5. Additionally, the processor or processing circuitry or function 201 may include a sub-portion 2015 usable as a portion for sending the model parts to be transferred. The portion 2015 may be configured to perform a processing according to S560 of FIG. 5.

Figure 8:
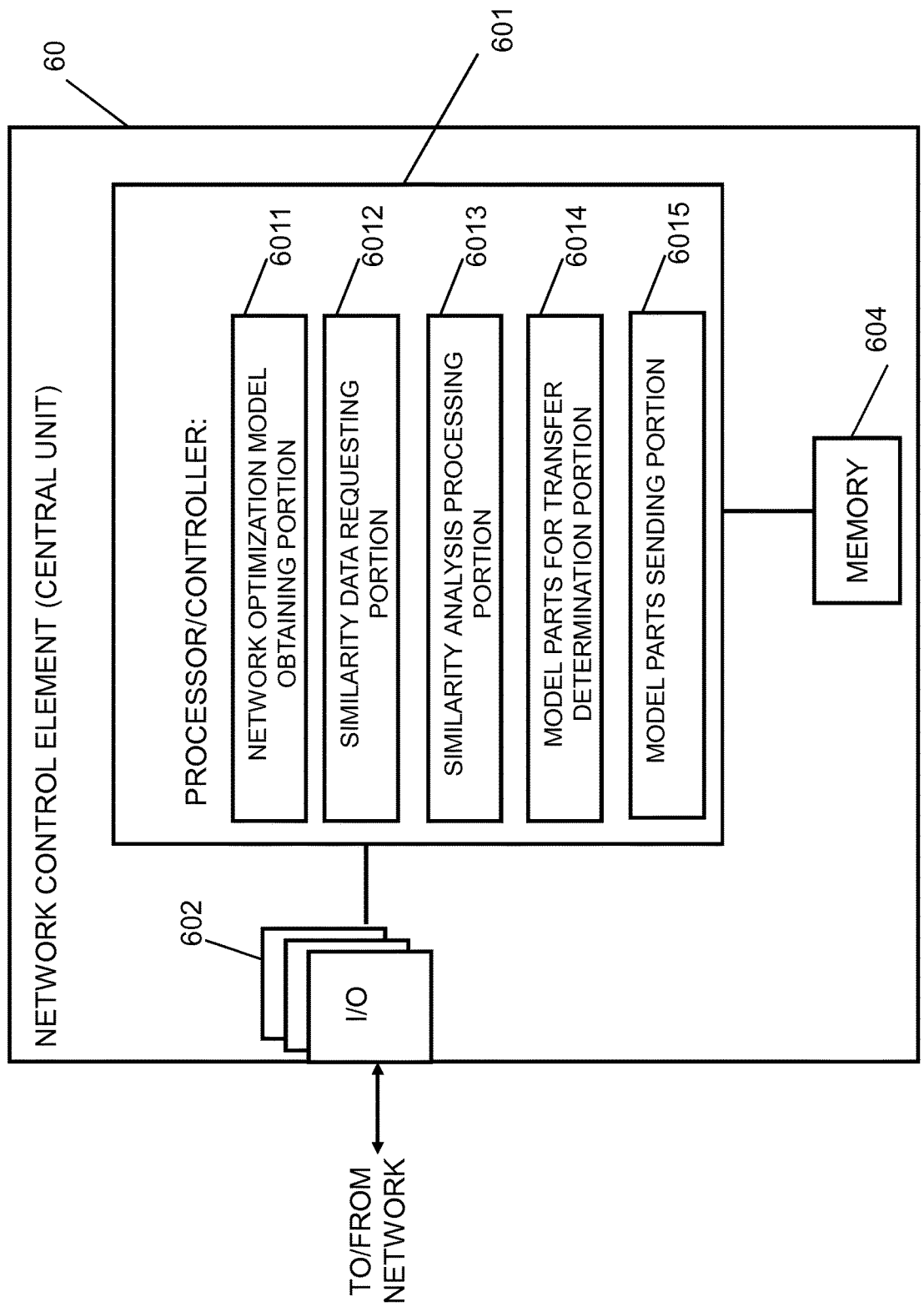
FIG. 8 shows a diagram of a communication network element according to some examples of embodiments.

FIG. 8 shows a diagram of a network element or function acting as a communication network control element or function according to some examples of embodiments, i.e. the central unit 60 of FIG. 1, which is communication network control element or function of a self-organizing communication network configured to control the distribution of the network optimization model to new network parts in a centralized scheme as described in connection with FIG. 3, for example. It is to be noted that the communication network control element or function, like the central unit 60 of FIG. 1, may include further elements or functions besides those described herein below. Furthermore, even though reference is made to a communication network control element or function, the element or function may be also another device or function having a similar task, such as a chipset, a chip, a module, an application etc., which can also be part of a network element or attached as a separate element to a network element, or the like. It should be understood that each block and any combination thereof may be implemented by various means or their combinations, such as hardware, software, firmware, one or more processors and/or circuitry.

The communication network control element like the central unit 60 shown in FIG. 8 may include a processing circuitry, a processing function, a control unit or a processor 601, such as a CPU or the like, which is suitable for executing instructions given by programs or the like related to the communication connection control procedure. The processor 601 may include one or more processing portions or functions dedicated to specific processing as described below, or the processing may be run in a single processor or processing function. Portions for executing such specific processing may be also provided as discrete elements or within one or more further processors, processing functions or processing portions, such as in one physical processor like a CPU or in one or more physical or virtual entities, for example. Reference sign 602 denotes input/output (I/O) units or functions (interfaces) connected to the processor or processing function 601. The I/O units 602 may be used for communicating with the other network elements or functions, such as other BSs like BS 20, 40, 50 and the like, as described in connection with FIGS. 1 and 3, for example. The I/O units 602 may be a combined unit including communication equipment towards several entities, or may include a distributed structure with a plurality of different interfaces for different entities. Reference sign 604 denotes a memory usable, for example, for storing data and programs to be executed by the processor or processing function 601 and/or as a working storage of the processor or processing function 601. It is to be noted that the memory 604 may be implemented by using one or more memory portions of the same or different type of memory.

The processor or processing function 601 is configured to execute processing related to the above described processing. In particular, the processor or processing circuitry or function 601 includes one or more of the following sub-portions. Sub-portion 6011 is a processing portion which is usable as a portion for obtaining (i.e. receiving) the network optimization model. The portion 6011 may be configured to perform processing according to S510 of FIG. 5. Furthermore, the processor or processing circuitry or function 601 may include a sub-portion 6012 usable as a portion for requesting similarity data. The portion 6012 may be configured to perform a processing according to S520 of FIG. 5. In addition, the processor or processing circuitry or function 601 may include a sub-portion 2013 usable as a portion for conducting a similarity analysis. The portion 6013 may be configured to perform a processing according to S530 and S540 of FIG. 5. Moreover, the processor or processing circuitry or function 601 may include a sub-portion 6014 usable as a portion for determining model parts to be transferred. The portion 6014 may be configured to perform a processing according to S550 of FIG. 5. Additionally, the processor or processing circuitry or function 601 may include a sub-portion 6015 usable as a portion for sending the model parts to be transferred. The portion 6015 may be configured to perform a processing according to S560 of FIG. 5.

Figure 9:
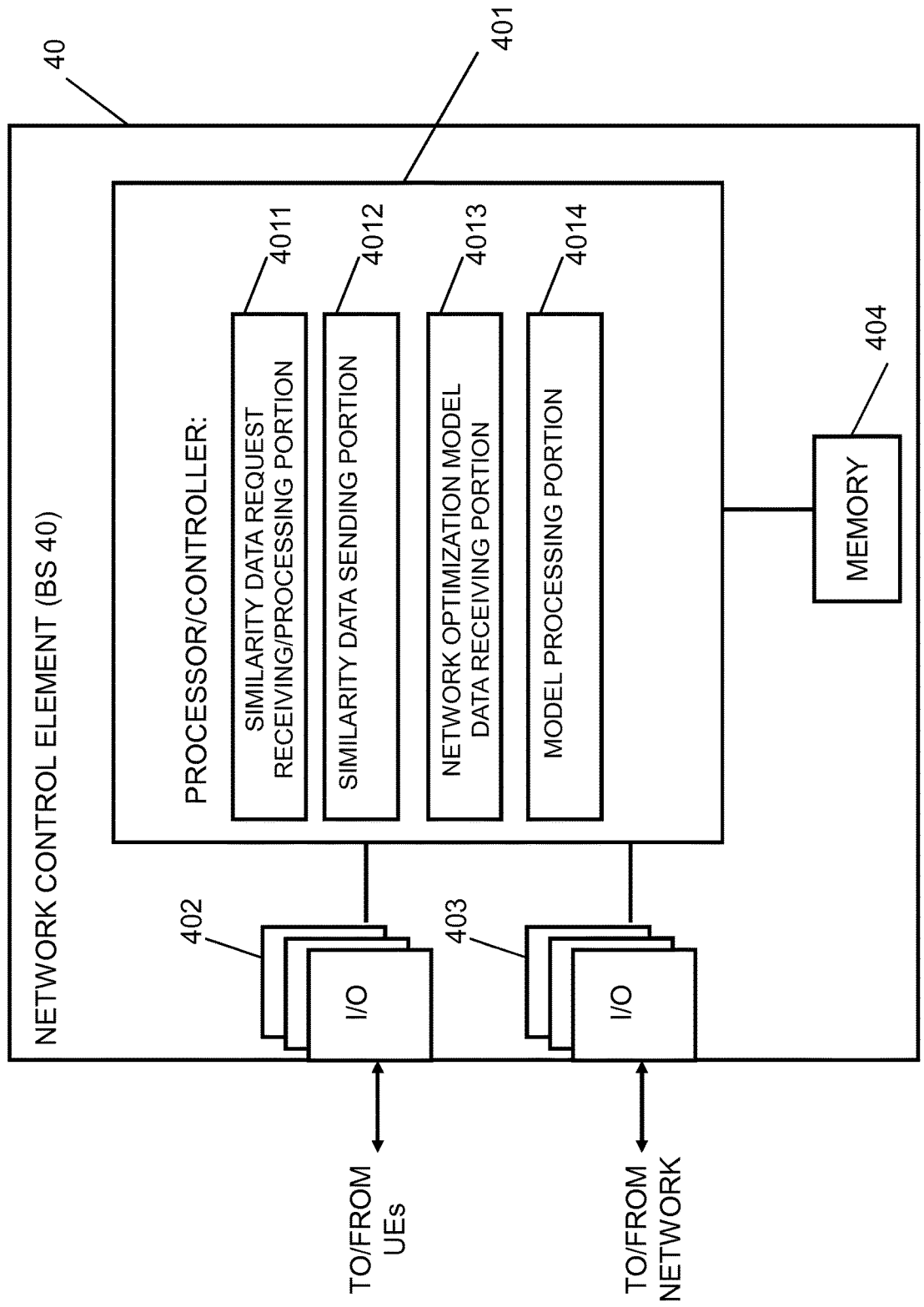
FIG. 9 shows a diagram of a communication network element according to some examples of embodiments.

FIG. 9 shows a diagram of a network element or function acting as a communication network control element or function according to some examples of embodiments, i.e. the BS 40 of FIG. 1, which is communication network control element or function of a self-organizing communication network configured to receive and process a network optimization model, wherein the network element is applicable in both a centralized and a distributed scheme as described in connection with FIGS. 2 and 3, for example. It is to be noted that the communication network control element or function, like the BS 40 of FIG. 1, may include further elements or functions besides those described herein below. Furthermore, even though reference is made to a communication network control element or function, the element or function may be also another device or function having a similar task, such as a chipset, a chip, a module, an application etc., which can also be part of a network element or attached as a separate element to a network element, or the like. It should be understood that each block and any combination thereof may be implemented by various means or their combinations, such as hardware, software, firmware, one or more processors and/or circuitry.

The communication network control element like the BS 40 shown in FIG. 9 may include a processing circuitry, a processing function, a control unit or a processor 401, such as a CPU or the like, which is suitable for executing instructions given by programs or the like related to the communication connection control procedure. The processor 401 may include one or more processing portions or functions dedicated to specific processing as described below, or the processing may be run in a single processor or processing function. Portions for executing such specific processing may be also provided as discrete elements or within one or more further processors, processing functions or processing portions, such as in one physical processor like a CPU or in one or more physical or virtual entities, for example. Reference signs 402 and 403 denote input/output (I/O) units or functions (interfaces) connected to the processor or processing function 401. The I/O units 402 may be used for communicating with a UE, for example. The i/O units 403 may be used for communicating with other network elements or functions, such as other BSs like BS 20 or the central unit 60 and the like, as described in connection with FIGS. 1, 2 and 3, for example. The I/O units 402 and 403 may be a combined unit including communication equipment towards several entities, or may include a distributed structure with a plurality of different interfaces for different entities. Reference sign 404 denotes a memory usable, for example, for storing data and programs to be executed by the processor or processing function 401 and/or as a working storage of the processor or processing function 401. It is to be noted that the memory 404 may be implemented by using one or more memory portions of the same or different type of memory.

The processor or processing function 401 is configured to execute processing related to the above described processing. In particular, the processor or processing circuitry or function 401 includes one or more of the following sub-portions. Sub-portion 4011 is a processing portion which is usable as a portion for receiving and processing a request for similarity data. The portion 4011 may be configured to perform processing according to S610 of FIG. 6. Furthermore, the processor or processing circuitry or function 401 may include a sub-portion 4012 usable as a portion for sending similarity data. The portion 4012 may be configured to perform a processing according to S620 of FIG. 6. In addition, the processor or processing circuitry or function 401 may include a sub-portion 4013 usable as a portion for receiving (at least a part of) a network optimization model. The portion 4013 may be configured to perform a processing according to S630 of FIG. 6. Moreover, the processor or processing circuitry or function 401 may include a sub-portion 4014 usable as a portion for processing the received model. The portion 4014 may be configured to perform a processing according to S640 of FIG. 6.

It is to be noted that examples of embodiments of the invention are applicable to various different network configurations. In other words, the examples shown in the above described figures, which are used as a basis for the above discussed examples, are only illustrative and do not limit the present invention in any way. That is, additional further existing and proposed new functionalities available in a corresponding operating environment may be used in connection with examples of embodiments of the invention based on the principles defined.

According to a further example of embodiments, there is provided, for example, an apparatus for use by a communication network control element or function configured to control a setting of parameters of a self-organizing communication network, the apparatus comprising means configured to obtain a pre-trained network optimization model indicating a mapping between a communication network environment forming an input of the model, optimization actions or decisions forming an output of the model, and system performance indicators forming a reward, means configured to cause sending, to at least one communication network element or function forming a part of the self-organizing communication network, a request for providing similarity data for a similarity analysis allowing to determine a similarity between a part of the self-organizing communication network for which the pre-trained network optimization model is derived and a part of the self-organizing communication network of the at least one communication network element or function to which the request is sent, means configured to perform the similarity analysis for determining a similarity between the part of the self-organizing communication network for which the pre-trained network optimization model is derived and each part of the self-organizing communication network for which similarity data for the similarity analysis are received, means configured to determine, on the basis of the similarity analysis, at least a part of the pre-trained network optimization model to be provided to the at least one communication network element or function forming a part of the self-organizing communication network from which the similarity data are received, and means configured to cause sending of the determined part of the pre-trained network optimization model to the at least one communication network element or function forming a part of the self-organizing communication network from which the similarity data are received.

Furthermore, according to some other examples of embodiments, the above defined apparatus may further comprise means for conducting at least one of the processing defined in the above described methods, for example a method according that described in connection with FIG. 5.

According to a further example of embodiments, there is provided, for example, an apparatus for use by a communication network element or function configured to conduct a setting of parameters of a self-organizing communication network, the apparatus comprising means configured to receive, from a communication network control element or function forming a part of the self-organizing communication network, and process a request for providing similarity data for a similarity analysis allowing to determine a similarity between parts of the self-organizing communication network, means configured to decide whether similarity data are required to be sent, in case the decision is affirmative, means configured to cause sending of the requested similarity data to the communication network control element or function from which the request is received, to receive data indicating at least a part of a pre-trained network optimization model indicating a mapping between a communication network environment forming an input of the model, optimization actions or decisions forming an output of the model, and system performance indicators forming a reward, and means configured to process the data indicating at least a part of a pre-trained network optimization model for generating an own network optimization model by adapting the received pre-trained network optimization model to the own part of the self-organizing communication network.

Furthermore, according to some other examples of embodiments, the above defined apparatus may further comprise means for conducting at least one of the processing defined in the above described methods, for example a method according that described in connection with FIG. 6.

According to a further example of embodiments, there is provided, for example, a non-transitory computer readable medium comprising program instructions for causing an apparatus to perform at least the following: obtaining a pre-trained network optimization model indicating a mapping between a communication network environment forming an input of the model, optimization actions or decisions forming an output of the model, and system performance indicators forming a reward, causing sending, to at least one communication network element or function forming a part of the self-organizing communication network, a request for providing similarity data for a similarity analysis allowing to determine a similarity between a part of the self-organizing communication network for which the pre-trained network optimization model is derived and a part of the self-organizing communication network of the at least one communication network element or function to which the request is sent, performing the similarity analysis for determining a similarity between the part of the self-organizing communication network for which the pre-trained network optimization model is derived and each part of the self-organizing communication network for which similarity data for the similarity analysis are received, determining, on the basis of the similarity analysis, at least a part of the pre-trained network optimization model to be provided to the at least one communication network element or function forming a part of the self-organizing communication network from which the similarity data are received, and causing sending of the determined part of the pre-trained network optimization model to the at least one communication network element or function forming a part of the self-organizing communication network from which the similarity data are received.

According to a further example of embodiments, there is provided, for example, a non-transitory computer readable medium comprising program instructions for causing an apparatus to perform at least the following: receiving, from a communication network control element or function forming a part of the self-organizing communication network, and process a request for providing similarity data for a similarity analysis allowing to determine a similarity between parts of the self-organizing communication network, deciding whether similarity data are required to be sent, in case the decision is affirmative, causing sending of the requested similarity data to the communication network control element or function from which the request is received, receiving data indicating at least a part of a pre-trained network optimization model indicating a mapping between a communication network environment forming an input of the model, optimization actions or decisions forming an output of the model, and system performance indicators forming a reward, and processing the data indicating at least a part of a pre-trained network optimization model for generating an own network optimization model by adapting the received pre-trained network optimization model to the own part of the self-organizing communication network.

By means of the above described procedure for network optimization, it is possible to achieve the following effects.

Compared to a model-based approach, the network optimization procedure according to examples of embodiments is configured to learn the optimization decision process by using transferred knowledge and thus with a limited number of collected samples in the new system, without explicitly estimating the closed-form model of a complex network system.

In the network optimization procedure according to examples of embodiments is configured, compared to a conventional model-based approach which requires well-defined network model as a priori knowledge, wherein a conventional stochastic data-driven approach requires to learn from scratch by following the same learning process for every new scenario, the proposed procedure can fully exploit the extracted knowledge from previous systems and adapt the model to the new system.

Moreover, in the network optimization procedure according to examples of embodiments, the transfer learning approach adapts to the new system by (at least) partially retraining or fine-tuning the pre-trained model, which leads to a faster learning process under the unknown dynamics.

Moreover, according to a network optimization procedure of the examples of embodiments as described above, the three types of the data cost, i.e. data storage, data transfer, and data collection can be reduced. This is because the knowledge is transferred to the new system by transferring partial (or complete) parameters and hyperparameters for a subset of the pretrained model, so that no measurement data needs to be transferred. This reduces the costs for local data storage and data transfer between the network elements. Moreover, since the above discussed procedure enables quick learning with limited training samples collected from the new system, it also decreases the costs for trail test and data collection.

It should be appreciated that an access technology via which traffic is transferred to and from an entity in the communication network may be any suitable present or future technology, such as WLAN (Wireless Local Access Network), WiMAX (Worldwide Interoperability for Microwave Access), LTE, LTE-A, 5G, Bluetooth, Infrared, and the like may be used; additionally, embodiments may also apply wired technologies, e.g. IP based access technologies like cable networks or fixed lines, fiber-optic networks, and the like.

embodiments suitable to be implemented as software code or portions of it and being run using a processor or processing function are software code independent and can be specified using any known or future developed programming language, such as a high-level programming language, such as objective-C, C, C++, C #, Java, Python, Javascript, other scripting languages etc., or a low-level programming language, such as a machine language, or an assembler.

implementation of embodiments is hardware independent and may be implemented using any known or future developed hardware technology or any hybrids of these, such as a microprocessor or CPU (Central Processing Unit), MOS (Metal Oxide Semiconductor), CMOS (Complementary MOS), BiMOS (Bipolar MOS), BiCMOS (Bipolar CMOS), ECL (Emitter Coupled Logic), and/or TTL (Transistor-Transistor Logic).

embodiments may be implemented as individual devices, apparatuses, units, means or functions, or in a distributed fashion, for example, one or more processors or processing functions may be used or shared in the processing, or one or more processing sections or processing portions may be used and shared in the processing, wherein one physical processor or more than one physical processor may be used for implementing one or more processing portions dedicated to specific processing as described, an apparatus may be implemented by a semiconductor chip, a chipset, or a (hardware) module including such chip or chipset;

embodiments may also be implemented as any combination of hardware and software, such as ASIC (Application Specific IC (Integrated Circuit)) components, FPGA (Field-programmable Gate Arrays) or CPLD (Complex Programmable Logic Device) components or DSP (Digital Signal Processor) components.

embodiments may also be implemented as computer program products, including a computer usable medium having a computer readable program code embodied therein, the computer readable program code adapted to execute a process as described in embodiments, wherein the computer usable medium may be a non-transitory medium.

Although the present invention has been described herein before with reference to particular embodiments thereof, the present invention is not limited thereto and various modifications can be made thereto.

The invention claimed is:

1. An apparatus for use by a communication network control element or function configured to control a setting of parameters of a self-organizing communication network, the apparatus comprising
at least one processing circuitry, and
at least one memory for storing instructions to be executed by the processing circuitry,
wherein the at least one memory and the instructions are configured to, with the at least one processing circuitry, cause the apparatus at least:
to obtain a pre-trained network optimization model indicating a mapping between a communication network environment forming an input of the model, optimization actions or decisions forming an output of the model, and system performance indicators forming a reward,
to cause sending, to at least one communication network element or function forming a part of the self-organizing communication network, a request for providing similarity data for a similarity analysis allowing to determine a similarity between a part of the self-organizing communication network for which the pre-trained network optimization model is derived and a part of the self-organizing communication network of the at least one communication network element or function to which the request is sent,
wherein the similarity data are related to corresponding network properties of the part of the self-organizing communication network for which the pre-trained network optimization model is derived and the part of the self-organizing communication network of the at least one communication network element or function to which the request is sent, and
wherein the corresponding network properties comprise data related to a single data point and data related to statistical measures and include at least one of location information, geographical features, mobility patterns, data demand statistics, and histograms approximating a probability density function,
to perform the similarity analysis for determining a similarity between the part of the self-organizing communication network for which the pre-trained network optimization model is derived and each part of the self-organizing communication network for which similarity data for the similarity analysis are received, wherein the similarity analysis is performed by determining a similarity measure between the network properties of the part of the self-organizing communication network for which the pre-trained network optimization model is derived, and the network properties of the part of the self-organizing communication network of the at least one communication network element or function to which the request is sent,
to determine, on the basis of the similarity analysis, at least a part of the pre-trained network optimization model to be provided to the at least one communication network element or function forming a part of the self-organizing communication network from which the similarity data are received, wherein the part of the pre-trained network optimization model comprises at least one convolutional layer of the pre-trained network optimization model, and
to cause sending of the determined part of the pre-trained network optimization model to the at least one communication network element or function forming a part of the self-organizing communication network from which the similarity data are received,
wherein the pre-trained network optimization model is derived by using a deep reinforcement learning algorithm based on a plurality of convolutional layers employed for capturing spatial and temporal correlations between a network environment of the part of the self-organizing communication network, and a plurality of fully connected layers employed for reducing dimensions of data processing in the plurality of convolutional layers to a desired output dimension,
wherein the pre-trained network optimization model is defined by a set of model parameters and hyperparameters.

2. The apparatus according to claim 1, wherein the at least one memory and the instructions are further configured to, with the at least one processing circuitry, cause the apparatus at least:
to obtain the pre-trained network optimization model by receiving data including the pre-trained network optimization model from a communication network element or function belonging to a part of the self-organizing communication network, wherein the apparatus is comprised in a central unit being in charge of collecting and managing usage of pre-trained network optimization models derived in the self-organizing communication network.

3. The apparatus according to claim 1, wherein the at least one memory and the instructions are further configured to, with the at least one processing circuitry, cause the apparatus at least:
to obtain the pre-trained network optimization model by deriving the pre-trained network optimization model from data and measurements conducted in a part of the self-organizing communication network, wherein the apparatus is comprised in communication network element or function forming a part of a distributed system for managing usage of pre-trained network optimization models derived in the self-organizing communication network.

4. The apparatus according to claim 1, wherein, for deriving the pre-trained network optimization model, input data are prepared by
determining how users of the communication network part are spatially distributed in the part of the self-organizing communication network and how the spatial distribution of the users evolves over time, determining a user activity level of the users in a specified time period, and generating an input sample including at least one of an image and a sequence of images in which a position of each pixel corresponds to a geographical grid or physical location of the users and an intensity or color value of each pixel corresponds to a user activity level aggregated over the geographical grid at the specified time period.

5. The apparatus according to claim 1, wherein the model parameters include at least one of weight matrices between each two successive layers of the plurality of convolutional layers and the plurality of fully connected layers, and bias vectors between each two successive layers of the plurality of convolutional layers and the plurality of fully connected layers, and the hyperparameters include at least one of a number of layers of the plurality of convolutional layers and the plurality of fully connected layers, a number of units at each layer of the plurality of convolutional layers and the plurality of fully connected layers, a type of an activation function, a number of filters and filter size in each of the plurality of convolutional layers, a stride size of each maximum or average pooling layer.

6. The apparatus according to claim 1, wherein the request for providing similarity data for a similarity analysis caused to be sent to at least one communication network element or function forming a part of the self-organizing communication network is included in an indication that a pre-trained network optimization model is present.

7. The apparatus according to claim 1, wherein the at least one memory and the instructions are further configured to, with the at least one processing circuitry, cause the apparatus at least:

for performing the similarity analysis for determining the similarity between the part of the self-organizing communication network for which the pre-trained network optimization model is derived and a part of the self-organizing communication network for which similarity data for the similarity analysis are received, to calculate a similarity measure on the basis of network properties of the part of the self-organizing communication network for which the pre-trained network optimization model is derived and the part of the self-organizing communication network for which similarity data for the similarity analysis are received, wherein the network properties comprise data related to a single data point and data related to statistical measures and include at least one of location information, geographical features, mobility patterns, data demand statistics, and histograms approximating a probability density function.

8. The apparatus according to claim 7, wherein the at least one memory and the instructions are further configured to, with the at least one processing circuitry, cause the apparatus at least:

to process, for determining at least a part of the pre-trained network optimization model to be provided to the at least one communication network element or function forming a part of the self-organizing communication network from which the similarity data are received, the calculated similarity measure, and to select, for forming the part of the pre-trained network optimization model to be provided, a subset of parameters and hyperparameters defining low and medium layers of the pre-trained network optimization model, wherein the higher the similarity between the part of the self-organizing communication network for which the pre-trained network optimization model is derived and the part of the self-organizing communication network for which similarity data for the similarity analysis are received is according to the similarity measure, the higher the number of parameters and hyperparameters selected for the subset becomes.

9. An apparatus for use by a communication network element or function configured to conduct a setting of parameters of a self-organizing communication network, the apparatus comprising at least one processing circuitry, and at least one memory for storing instructions to be executed by the processing circuitry, wherein the at least one memory and the instructions are configured to, with the at least one processing circuitry, cause the apparatus at least:

to receive, from a communication network control element or function forming a part of the self-organizing communication network, and process a request for providing similarity data for a similarity analysis allowing to determine a similarity between parts of the self-organizing communication network, wherein the similarity data are related to network properties and comprise data related to a single data point and data related to statistical measures and include at least one of location information, geographical features, mobility patterns, data demand statistics, and histograms approximating a probability density function, to decide whether similarity data are required to be sent, in case the decision is affirmative, to cause sending of the requested similarity data to the communication network control element or function from which the request is received, to receive data indicating at least a part of a pre-trained network optimization model indicating a mapping between a communication network environment forming an input of the model, optimization actions or decisions forming an output of the model, and system performance indicators forming a reward, and to process the data indicating at least a part of a pre-trained network optimization model for generating an own network optimization model by adapting the received pre-trained network optimization model to the own part of the self-organizing communication network, and for processing the data indicating at least a part of a pre-trained network optimization model for generating an own network optimization model, to conduct at least one of a fine-tuning of the received part of the pre-trained network optimization model and an updating of the pre-trained network optimization model with data collected in the own part of the self-organizing communication network by using transfer learning.

10. The apparatus according to claim 9, wherein the at least one memory and the instructions are further configured to, with the at least one processing circuitry, cause the apparatus at least:

to receive the request for providing similarity data for the similarity analysis from a central unit being in charge of collecting and managing usage of pre-trained network optimization models derived in the self-organizing communication network, or from a communication network element or function deriving the pre-trained network optimization model and forming a part of a distributed system for managing usage of pre-trained network optimization models derived in the self-organizing communication network,
    wherein the request for providing similarity data is included in an indication that a pre-trained network optimization model is present.

11. The apparatus according to claim 9, wherein the at least one memory and the instructions are further configured to, with the at least one processing circuitry, cause the apparatus at least:
    to check, for deciding whether similarity data are required to be sent in response to the request, whether or not an own network optimization model is available,
    in case an own network optimization model is not available, to decide that similarity data are required to be sent, and
    in case an own network optimization model is available, to decide that similarity data are not required to be sent, and to cause sending of an indication to reject the request for similarity data.

12. The apparatus according to claim 9, wherein the pre-trained network optimization model is based on a deep reinforcement learning algorithm based on a plurality of convolutional layers employed for capturing spatial and temporal correlations between the network environment of a part of the self-organizing communication network, and a plurality of fully connected layers employed for reducing dimensions of data processing in the plurality of convolutional layers to a desired output dimension, wherein the pre-trained network optimization model is defined by a set of model parameters and hyperparameters.

13. The apparatus according to claim 12, wherein
    the model parameters include at least one of weight matrices between each two successive layers of the plurality of convolutional layers and the plurality of fully connected layers, and bias vectors between each two successive layers of the plurality of convolutional layers and the plurality of fully connected layers, and
    the hyperparameters include at least one of a number of layers of the plurality of convolutional layers and the plurality of fully connected layers, a number of units at each layer of the plurality of convolutional layers and the plurality of fully connected layers, a type of an activation function, a number of filters and filter size in each of the plurality of convolutional layers, a stride size of each maximum or average pooling layer.

14. The apparatus according to claim 12, wherein the at least one memory and the instructions are further configured to, with the at least one processing circuitry, cause the apparatus at least: for processing the data indicating at least a part of a pre-trained network optimization model for generating an own network optimization model,
    to modify the received part of the pre-trained network optimization model by conducting at least one of
        adding at least one of a new convolutional layer and a new fully connected layer to the part of the pre-trained network optimization model,
        modifying at least one convolutional layer and fully connected layer of the part of the pre-trained network optimization model, and
    to retrain the modified network optimization model including the added or modified layers by using measurement data obtained in the own part of the self-organizing communication network.

15. A method for use in a communication network control element or function configured to control a setting of parameters of a self-organizing communication network, the method comprising
    obtaining a pre-trained network optimization model indicating a mapping between a communication network environment forming an input of the model, optimization actions or decisions forming an output of the model, and system performance indicators forming a reward,
    causing sending, to at least one communication network element or function forming a part of the self-organizing communication network, a request for providing similarity data for a similarity analysis allowing to determine a similarity between a part of the self-organizing communication network for which the pre-trained network optimization model is derived and a part of the self-organizing communication network of the at least one communication network element or function to which the request is sent,
        wherein the similarity data are related to corresponding network properties of the part of the self-organizing communication network for which the pre-trained network optimization model is derived and the part of the self-organizing communication network of the at least one communication network element or function to which the request is sent, and
        wherein the corresponding network properties comprise data related to a single data point and data related to statistical measures and include at least one of location information, geographical features, mobility patterns, data demand statistics, and histograms approximating a probability density function,
    performing the similarity analysis for determining a similarity between the part of the self-organizing communication network for which the pre-trained network optimization model is derived and each part of the self-organizing communication network for which similarity data for the similarity analysis are received, wherein the similarity analysis is performed by determining a similarity measure between the network properties of the part of the self-organizing communication network for which the pre-trained network optimization model is derived, and the network properties of the part of the self-organizing communication network of the at least one communication network element or function to which the request is sent,
    determining, on the basis of the similarity analysis, at least a part of the pre-trained network optimization model to be provided to the at least one communication network element or function forming a part of the self-organizing communication network from which the similarity data are received, wherein the part of the pre-trained network optimization model comprises at least one convolutional layer of the pre-trained network optimization model, and
    causing sending of the determined part of the pre-trained network optimization model to the at least one communication network element or function forming a part of the self-organizing communication network from which the similarity data are received,
    wherein the pre-trained network optimization model is derived by using a deep reinforcement learning algorithm based on a plurality of convolutional layers employed for capturing spatial and temporal correlations between a network environment of the part of the self-organizing communication network, and a plurality of fully connected layers employed for reducing dimensions of data processing in the plurality of convolutional layers to a desired output dimension, wherein the pre-trained network optimization model is defined by a set of model parameters and hyperparameters.

16. The method according to claim 15, further comprising at least one of:
obtaining the pre-trained network optimization model by receiving data including the pre-trained network optimization model from a communication network element or function belonging to a part of the self-organizing communication network, wherein the method is implemented in a central unit being in charge of collecting and managing usage of pre-trained network optimization models derived in the self-organizing communication network;
obtaining the pre-trained network optimization model by deriving the pre-trained network optimization model from data and measurements conducted in a part of the self-organizing communication network, wherein the method is implemented in communication network element or function forming a part of a distributed system for managing usage of pre-trained network optimization models derived in the self-organizing communication network.

17. The method according to claim 15, further comprising for performing the similarity analysis for determining the similarity between the part of the self-organizing communication network for which the pre-trained network optimization model is derived and a part of the self-organizing communication network for which similarity data for the similarity analysis are received, calculating a similarity measure on the basis of network properties of the part of the self-organizing communication network for which the pre-trained network optimization model is derived and the part of the self-organizing communication network for which similarity data for the similarity analysis are received,
wherein the network properties comprise data related to a single data point and data related to statistical measures and include at least one of location information, geographical features, mobility patterns, data demand statistics, and histograms approximating a probability density function.

18. The method according to claim 17, further comprising processing, for determining at least a part of the pre-trained network optimization model to be provided to the at least one communication network element or function forming a part of the self-organizing communication network from which the similarity data are received, the calculated similarity measure, and
selecting, for forming the part of the pre-trained network optimization model to be provided, a subset of parameters and hyperparameters defining low and medium layers of the pre-trained network optimization model, wherein the higher the similarity between the part of the self-organizing communication network for which the pre-trained network optimization model is derived and the part of the self-organizing communication network for which similarity data for the similarity analysis are received is according to the similarity measure, the higher the number of parameters and hyperparameters selected for the subset becomes.

* * * * *